US011012720B1

(12) United States Patent
Chundi et al.

(10) Patent No.: US 11,012,720 B1
(45) Date of Patent: May 18, 2021

(54) SYSTEMS AND METHODS FOR MANAGING STORAGE OF MEDIA CONTENT ITEM

(71) Applicant: Rovi Guides, Inc., San Jose, CA (US)

(72) Inventors: Charishma Chundi, Andhra Pradesh (IN); Susanto Sen, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/827,390

(22) Filed: Mar. 23, 2020

(51) Int. Cl.
*H04N 21/231* (2011.01)
*H04N 21/258* (2011.01)
*H04N 21/24* (2011.01)
*H04N 21/845* (2011.01)
*H04N 21/84* (2011.01)

(52) U.S. Cl.
CPC ... *H04N 21/23113* (2013.01); *H04N 21/2407* (2013.01); *H04N 21/25891* (2013.01); *H04N 21/84* (2013.01); *H04N 21/8456* (2013.01)

(58) Field of Classification Search
CPC combination set(s) only.
See application file for complete search history.

(56) References Cited

U.S. PATENT DOCUMENTS

| 5,790,176 | A * | 8/1998 | Craig | H04N 1/2179 |
| | | | | 348/E7.069 |
| 9,276,941 | B2 * | 3/2016 | Cakarel | H04N 21/47202 |
| 9,596,503 | B1 * | 3/2017 | Greene | H04N 5/775 |
| 10,462,410 | B2 * | 10/2019 | Tang | H04N 5/85 |
| 10,503,832 | B2 | 12/2019 | Malhotra et al. | |
| 10,819,819 | B2 * | 10/2020 | Bergman | H04N 21/23106 |
| 2004/0103437 | A1 * | 5/2004 | Allegrezza | H04N 21/2225 |
| | | | | 725/95 |
| 2004/0187159 | A1 * | 9/2004 | Gaydos, Jr. | H04N 21/2181 |
| | | | | 725/92 |
| 2004/0210932 | A1 * | 10/2004 | Mori | H04N 21/44204 |
| | | | | 725/39 |
| 2010/0088291 | A1 * | 4/2010 | Bhogal | H04N 21/4532 |
| | | | | 707/705 |
| 2011/0093905 | A1 * | 4/2011 | McKinley | H04N 21/23106 |
| | | | | 725/92 |
| 2014/0149533 | A1 * | 5/2014 | Bergman | H04N 21/231 |
| | | | | 709/213 |
| 2015/0237384 | A1 * | 8/2015 | Ruffini | H04N 21/25891 |
| | | | | 725/92 |
| 2015/0244971 | A1 * | 8/2015 | Wickenkamp | H04N 5/782 |
| | | | | 386/295 |
| 2018/0184137 | A1 * | 6/2018 | Epstein | H04N 21/25891 |
| 2019/0005513 | A1 | 1/2019 | Bennett | |

OTHER PUBLICATIONS

U.S. Appl. No. 16/827,392, filed Mar. 23, 2020, Charishma Chundi.

* cited by examiner

*Primary Examiner* — Fernando Alcon
(74) *Attorney, Agent, or Firm* — Haley Guiliano LLP

(57) ABSTRACT

Systems and methods are described to selectively provide a buffer time prior to deletion of a media content item. In particular, techniques are presented for transmitting a proposal to delay deletion of a media content item, in response to determining that a number of identified users likely to view the media content item exceeds a predetermined number. Systems and methods are also described to identify a user who is likely to view the media content item, and present to the identified user an offer to extend availability of a media content item. Deletion of the media content item may be delayed by a predetermined time period.

20 Claims, 11 Drawing Sheets

SYSTEMS AND METHODS FOR MANAGING STORAGE OF MEDIA CONTENT ITEM

BACKGROUND

This disclosure is directed to selectively providing a buffer time prior to deletion of a media content item. In particular, techniques are disclosed for transmitting a proposal to delay deletion of a media content item, and for presenting to an identified user an offer to extend availability of a media content item.

Advancements in digital transmission of media content, such as online media streaming or download services, have increasingly enabled users to access media content from various network-connected devices at home or on the go. With this increase in media content available to users, storing and maintaining large databases of such media content, while providing the user with a convenient and simple experience in viewing and searching through such content, has become a challenge. In addition, management of deletion of media content presents additional problems. Some unneeded media content items are never deleted, leading to unnecessary waste of storage space and power. On the other hand, deletion of media content items that are still needed can leave users without access to desired or needed content. Worse, deletion can often occur without warning, which further exacerbates the problem, because affected systems are unable to take preemptive action before content is deleted.

In one approach to managing storage, when a user (e.g., an uploading user) requests to delete a media content item that is accessible to other users (e.g., consumer users), instead of an immediate deletion, the media content item may be retained for a "cooling-off" period before permanent deletion. However, this is deficient, because a cooling-off period for every content item (including clearly unnecessary content items) will consume resources of the system, such as storage space, and degrade processing times and performance of the system due to the need to retain unnecessary content items. Another problem of this approach is that the user is not presented with any additional information, so at the end of the cooling-off period, the user may still be ignorant about the demand for the content item that is to be deleted. However, it is undesirable to delete media content that is in high demand, as such premature deletion can result in user frustration over the deletion of content without warning because a consumer user's system is unable to mitigate the deletion (e.g., by downloading a local copy).

Accordingly, to overcome such deficiencies of other approaches to storage management of media content, systems and methods are provided herein for managing access to a media content item stored on a server when a request to delete the media content item is received. Such systems and methods provide, for users (e.g., consumer users) likely to be interested in a media content item, an opportunity to view the media content item prior to deletion, while not bothering consumer users unlikely to be interested in the media content item and freeing up storage space by deleting content likely to have a low amount of interested users. In some embodiments, such systems also evaluate predicted impact of the deletion and propose or execute mitigating actions only in cases of the impact exceeding a threshold.

In some aspects of the disclosure, in response to receiving the request (e.g., from the uploading user) to delete the media content item stored on the server, a calculation can be performed as to the number of users (e.g., consumer users), among a plurality of users (e.g., consumer users) having access to the media content item, that are likely to access the media content item during a predetermined time period (e.g., one week). If it is determined that the calculated number of identified users exceeds a predetermined number, a proposal to delay the deletion of the media content item is transmitted (e.g., to the uploading user) for display. If the proposal is accepted, the deletion is delayed. In this way, storage at the server is efficiently allocated, as the media content item to be deleted need not be retained if there is minimal interest to the users, but the media content item is retained at the server for the predetermined period for access by the identified users likely to have sufficient interest in the media content item.

In some embodiments, the various techniques can be used to estimate impact of the proposed deletion. For example, respective media content item viewing profiles associated with each of the plurality of users who have access to the media content can be retrieved, and a subset of the retrieved media content item viewing profiles having metadata (e.g., metadata corresponding to previously viewed media content items) matching metadata of the media content item stored on the server can be identified. The size of such subset may then be used as an estimate for the number of users likely to access the media content item (e.g., during the predetermined period).

In some approaches, upon receiving a request to delete the media content item stored on the server, a user who is likely to view the media content item during a predetermined time period can be identified. An offer to extend availability of the media content item can be presented to the identified user. In response to receiving acceptance of the offer, the media content item can be made accessible to the identified user during the predetermined time period. In addition, such media content item can be made inaccessible to the plurality of users, e.g., other users that are identified as unlikely to view the media content item during the predetermined time period or otherwise decline an offer to extend availability of the media content item. In this way, users may be notified of the deletion of the media content item when it is likely that the user will be interested in viewing the media content item. On the other hand, where a user is unlikely to be interested in the media content item, the system can avoid interrupting the user or clogging up the user's screen and/or e-mails with notifications that he or she is unlikely to be interested in.

In some aspects of the disclosure, the proposal to delay the deletion of the media content item comprises the calculated number of the users likely to access the media content item during the predetermined time period. For example, a user that uploaded the media content item to the server and is now requesting to delete the media content item can have an idea of the total number of users likely to be interested in the content, which may assist the user in deciding whether to accept the proposal.

In some embodiments, deletion of the media content item can also be delayed for the predetermined period. For example, the predetermined period may be one day, one week or one month, in some embodiments. In some embodiments, the user can be provided with the opportunity (e.g., via a user interface) to select a delay duration for the predetermined time period, and the deletion of the media content item can be delayed for the selected duration. Alternatively, the system can estimate an ideal or optimal time to delete the media content item from the server, and this estimated time can be selected as the predetermined time period.

The proposal to delay the deletion can comprise a proposal to delay deletion of only a portion of the media content item (e.g., a portion that is smaller than the entire media content item). For example, even if the number of users likely to be interested in an entire media content item is determined to be relatively low, it may be the case that a particular portion of the media content item is likely to interest a relatively high number of users, and in such a case, it may be advantageous to provide an opportunity for such portion to be viewed by users, prior to deletion of the media content item. The proposal can optionally include a proposal to delay the deletion of only the portion of the media content item, such as in a case where an insufficient number of users are interested in the entire media content item but a sufficient number of users are determined as likely to be interested in the portion of the media content item, or both the proposal to delay the deletion of the portion of the media content item and the proposal to delay the deletion of the entire the media content item, such as in a case where a sufficient number of users are likely to be interested in the entire media content item and a sufficient number of users are determined as likely to be interested in the portion of the media content item.

In some aspects of this disclosure, a proposal to extend the predetermined time period (e.g., the period corresponding to the delay in deleting the media content item) can be transmitted. For example, the user that uploads a media content item may receive feedback from another user that, even though that user previously accepted an offer to extend availability of the media content item for the predetermined time, such consumer user did not have a chance to view the uploaded media content item, due, for example, to unforeseen circumstances. In such a case, it may be desirable to provide an opportunity to the user to extend the availability of the media content item beyond the predetermined time period. The offer to extend availability of the media content item beyond the predetermined time period can include an offer to extend availability of a portion of the media content item, and/or the entirety of the media content item.

In some embodiments, the user can be provided with the opportunity (e.g., via a user interface) to select a delay duration for the predetermined time period, and the deletion of the media content item can be delayed for the selected duration. Alternatively, the system can estimate an ideal or optimal time to delete the media content item from the server, and this estimated time can be selected as the predetermined time period.

The offer to extend availability of a portion of the media content item can comprise an offer to extend availability of a portion of the media content item. For example, even if the user is not identified as being interested in the entire media content item, it may be the case that a particular portion of the media content item is likely to interest the user, and in such a case, it may be advantageous to provide an opportunity for the user to view this portion, prior to deletion of the media content item. The offer can optionally include the offer to extend availability of only the portion of the media content item, such as in a case where the user is identified as unlikely to be interested in the entire media content item but is identified as likely to be interested in the portion of the media content item, or both the offer to extend availability of the portion of the media content item and the offer to extend availability of the entire media content item, such as in a case where the user is identified as likely to be interested in the portion of the media content item and is also identified as likely to be interested in the entire media content item.

In some aspects of the disclosure, a list including each media content item or portion thereof that will be inaccessible to the user after the predetermined time period can be presented to the identified user. For example, such list can provide the user with an overview of each media content item he or she is identified as likely to be interested in, and provide the user with an opportunity to extend availability of desired media content items.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Methods and systems are provided herein for transmitting a proposal to delay deletion of a media content item and presenting to an identified user an offer to extend availability of a media content item.

Figure 1A:
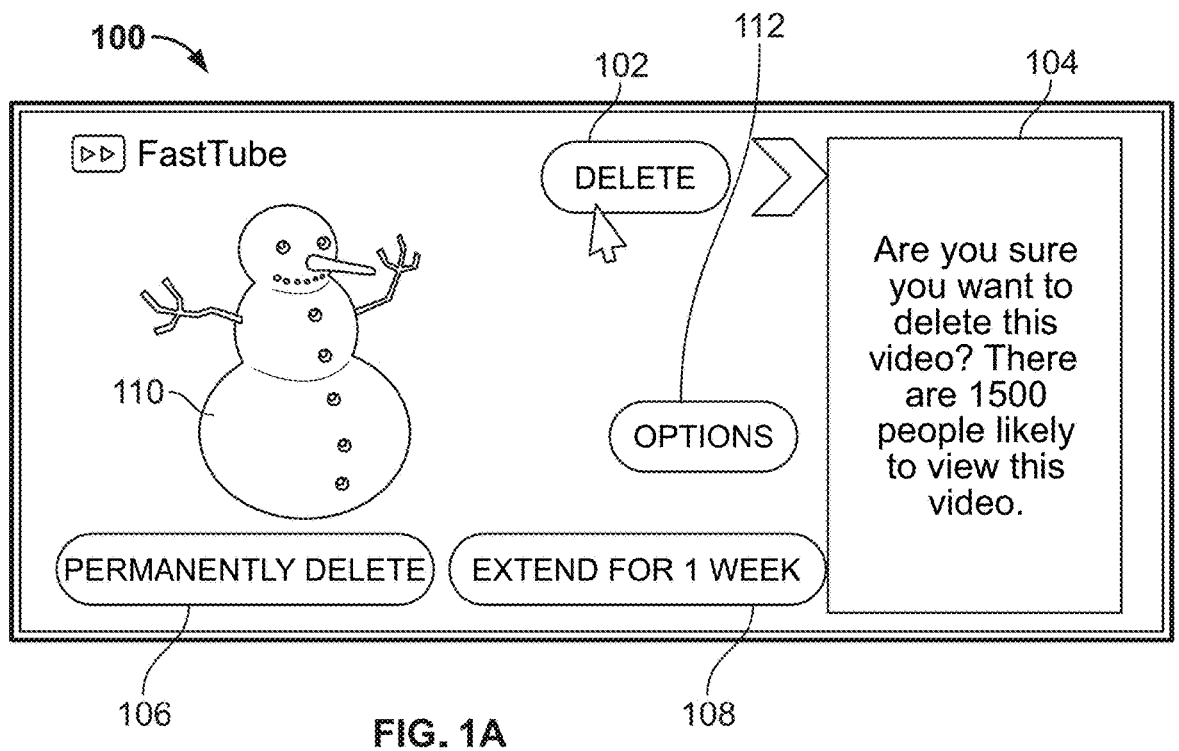
FIGS. 1A-1E show illustrative display screens that may be used to provide a proposal to delay the deletion of a media content item, in accordance with some embodiments of the disclosure.

FIG. 1A depicts an exemplary display screen 100 (e.g., provided by a deletion management application) that is provided on a display of a user device in communication with a server, to display a proposal to delay deletion of a media content item. The server may be associated with a media provider (e.g., a streaming or download channel or website), and the display screens may be provided by the deletion management application, which may be run on the server and/or on user devices (e.g., utilized by uploading users and consumer users). The server may receive an upload of the media content item from the user, such that the server receives requests from multiple other users (e.g., via user devices) to access the media content item. For example, icon 110 represents a media content item stored on the server and having the title "Ice Man." If a selection of option 102 is received from a user (e.g., the user from which the server received upload of the media content item to a streaming channel or download site), notification 104 is displayed on the user interface of display 101. The notification 104 indicates to the user, based on a calculation (e.g., performed by the deletion management application), a certain amount of users (e.g., 1500) who are likely to access the media content item, if access to the media content item were to be extended for a predetermined time period (e.g., one week) by selecting option 108. In some embodiments, the notification 104 may be displayed only if it is determined that the number of users likely to be interested in the media content item is above a predetermined threshold (e.g., more than 5% of the users who have access to the media content), so that the user need not be bothered with a notification in a case where there is determined to be minimal interest in the media content item (e.g., over a predetermined time period). Such threshold can be selected by the user or automatically suggested by the system. If the proposal is accepted by the user via the user device, the user device may send a notification of such acceptance to the server, and the server can extend access to the media content item (e.g., "Ice Man") to the users determined to be likely to access the media content item. The proposal could additionally or alternatively be sent to a notification (e.g., an email address associated with the user that uploaded the media content item). At the end of the delay period, the media content may be automatically and permanently deleted. In some embodiments, at the end of the delay period, the deletion management application may re-prompt for user confirmation to permanently delete the media content item. Alternatively, the proposal to extend access to the media content item can be declined if selection of option 106 is received, from the user, to permanently delete the media content item. Such aspects (e.g., shown in FIG. 1A) can enable an uploading user (and/or a media content provider) to automatically increase traffic to uploads of media content items that are prioritized to be deleted.

In some embodiments, the media content item, during the delay period, may also be marked as deleted, although not actually deleted, and may be identified by the system based on such marking. The marking may include the scheduled deletion date. The media content item may be marked as deleted in response to receiving from the user an instruction to delete the media content item. After transmitting the proposal to extend access to the media content item to the user device, the server may receive notification that such proposal has been accepted by the user, and may delay the scheduled deletion date accordingly (e.g., if the predetermined period of time is selected to be one week, the scheduled deletion date would be pushed back by one week). Periodically, a deletion process (e.g., performed by the deletion management application) may check markings associated with the media content items stored at the server and delete media content items having such markings on the scheduled deletion dates (e.g., upon expiration of the predetermined period of time).

Figure 1B:
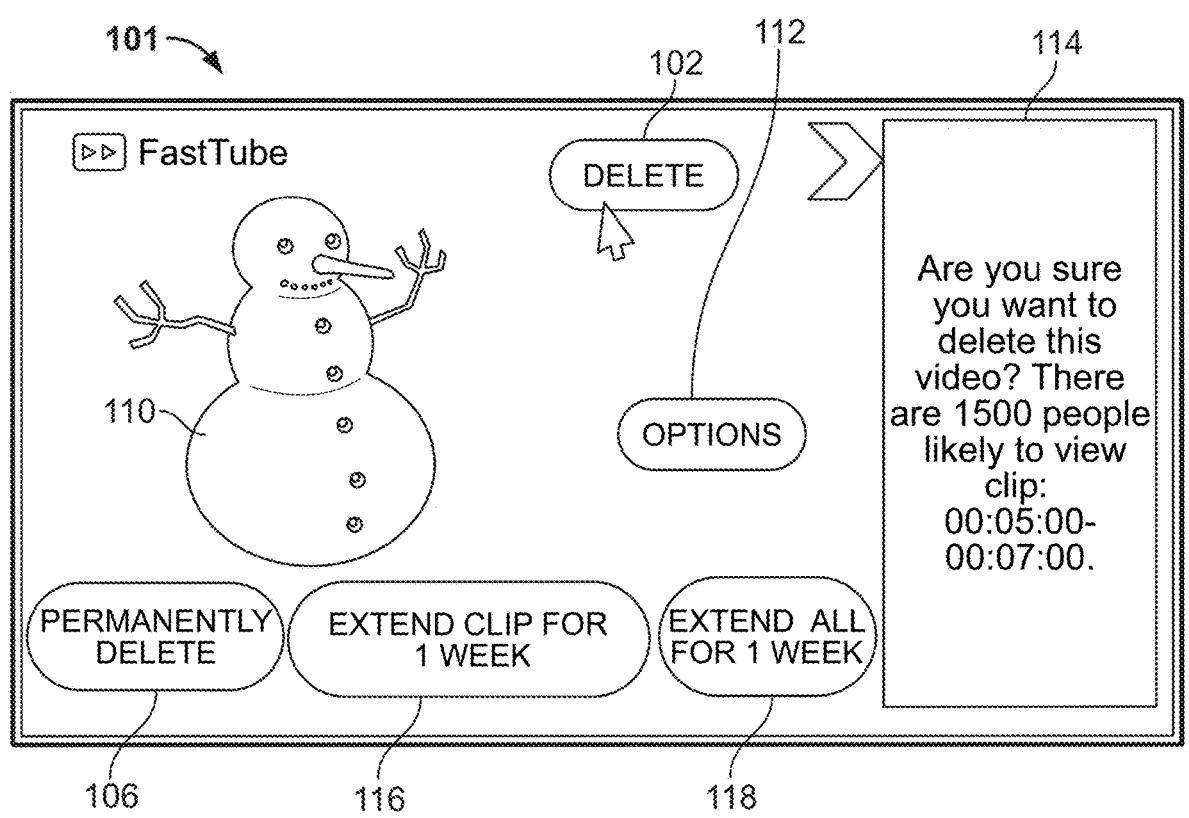

FIG. 1B depicts an exemplary display screen 101, which includes a proposal to delay deletion of a portion of a media content item (e.g., a portion that is smaller than the entire media content item). Such proposal can be transmitted from the server to the user device and displayed by the user device after receiving the proposal. For example, even if the calculated number of users likely to be interested in the entire media content item (e.g., 900), is below the predetermined number (e.g., 1250), it may be the case that the calculated number of users (e.g., 1500) likely to be interested in a particular portion of the media content item is above the predetermined number. Notification 114 can offer to the user (e.g., the user who uploaded the media content item and is requesting deletion of the media content item) a proposal to extend access to the particular portion (e.g., a clip at 00:05:00-00:07:00) of the media content item 110 determined as likely to have sufficient interest among users with access to the content. Display screen 101 provides option 116 to extend access to only the particular portion for the predetermined period (e.g., one week) and can also provide option 118 to extend access to the entire media content item for the predetermined period. Alternatively, only option 116 among options 116 and 118 may be provided for selection, such as in a case where the calculated number of users likely to be interested in the entire media content item is below the predetermined number, but the calculated number of users likely to be interested in a particular portion of the media content item exceeds the predetermined number. The display screen 101 may also provide a proposal to extend multiple clips of a media content item, such as when the calculated number of users likely to be interested in each of such clips is above the predetermined number.

In order to provide access to only a portion of a media content item (e.g., to a user among the predetermined number of users determined as likely interested in the portion of the media content item), access rights associated with an account of a consumer user (or access rights associated with the original media content item file) may be modified to disable the user from viewing certain portions of the media content item. Alternatively, or in addition to such modification of access rights, a copy of the media content item stored at the server may be made in which portions (other than the desired portion to be provided to the user) are deleted. The consumer user may be restricted from viewing the original file (e.g., one or more files corresponding to the entire media content item) but may be permitted to view the modified file having only the portion of the media content item.

Various methods can be employed to calculate how many users are likely to be interested in a media content item (or a portion thereof) during the delay duration (or buffer period). For example, each user can be associated with a media content item viewing profile, which can include usage history data for a particular user (e.g., search or consumption history, manual choice of genres/keywords, specific queries from the user, indications received from the user of liking or disliking certain media content items, media content items that were reviewed or commented on or otherwise interacted with by the user). When a media content item is selected for deletion, respective media content item viewing profiles of the user can be retrieved, metadata of each profile can be compared with metadata of the media content item stored on the server, and a size of a subset of users having profiles with metadata matching the metadata of the media content item can be determined, where such subset may correspond to the number of users likely to be interested in the media content item during the delay duration. A similar process used to recommend media content items to users (which can be based, e.g., on the user's media content item viewing profile) prior to receiving a deletion instruction may be used to identify users likely to be interested in the media content item during the buffer period. In some embodiments, if a user has already viewed a media content item (or portion thereof), the user may not be counted as a user likely to be interested in the media content item (or the portion thereof), even if the user otherwise would be determined as likely to be interested in viewing media content item based on the user's profile. However, in some embodiments, if it is determined that a user has a history of re-watching the same media content item, based on the user's media content item viewing profile, the user can be included in the number of users likely to access the media content item. Systems and methods for predicting user consumption are discussed in greater detail in connection with Bennett et al., U.S. Patent Publication No. 2019/0005513 A1, published Jan. 3, 2019, which is hereby incorporated by reference herein in its entirety.

Figure 1C:
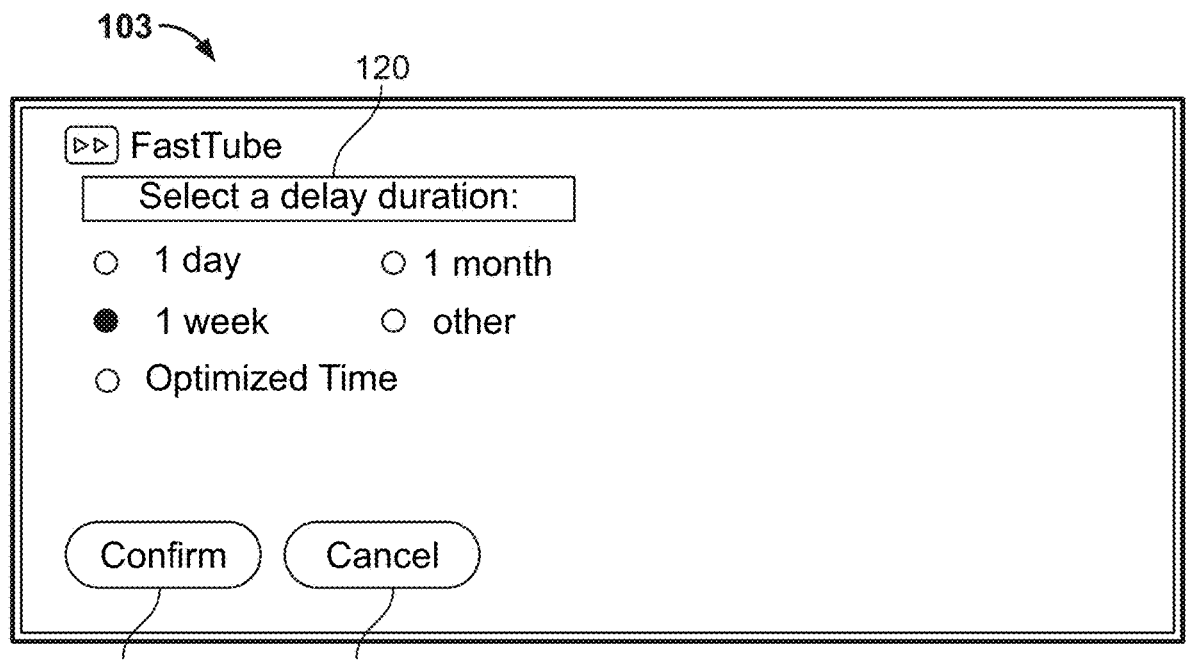

As shown in the exemplary example of FIG. 1C, display screen 105 presents the user with options regarding setting the predetermined time period, to extend access to the media content item. For example, when the user selects option 112 in FIGS. 1A-1B, the user may be presented with screen 103, which can include option 120 for setting the delay duration (e.g., the amount of time that the deletion of the media content item is to be postponed). The user may select a time period (e.g., 1 day, 1 month, 1 week 1 month, 1 week) from among suggested options, or may enter in a custom time period ("other"). Alternatively, the user can request an optimized time for the delay duration to be calculated and use the optimized time as the delay duration. The optimized time can be calculated based on various parameters, and can be set to increase the likelihood of the user accessing the content while at the same time avoiding retaining the media content item unnecessarily. For example, it may be determined, based on the respective media content item viewing profiles of the users likely to be interested in accessing the media content item, that such users consume media content items once every 10 days on average. Thus, the optimized time for the delay duration may be suggested to be 10 days, so as to provide an opportunity for an average user in the subset to access the content while avoiding unnecessarily compromising performance or consuming storage space by retaining the media content item for too long a period. Once the user is satisfied with his or her selection, he or she may select option 122 to confirm the selection. In some embodiments, the predetermined number of users (e.g., to which the number of users likely to be interested in a media content item is compared) may be adjusted in accordance with the duration of the delay duration, or vice versa. For example, it may be the case that if the delay duration is one day, users who access media only once per week would be unlikely to view the media in a one-day time period, even if such users would be likely be interested in the content, and in such a case the predetermined number of users can be adjusted (e.g., decreased) accordingly. On the other hand, if a relatively long delay duration is selected (e.g., one month), the predetermined number of users may be increased relative to a scenario where the delay duration is relatively short (e.g., one day).

Figure 1D:
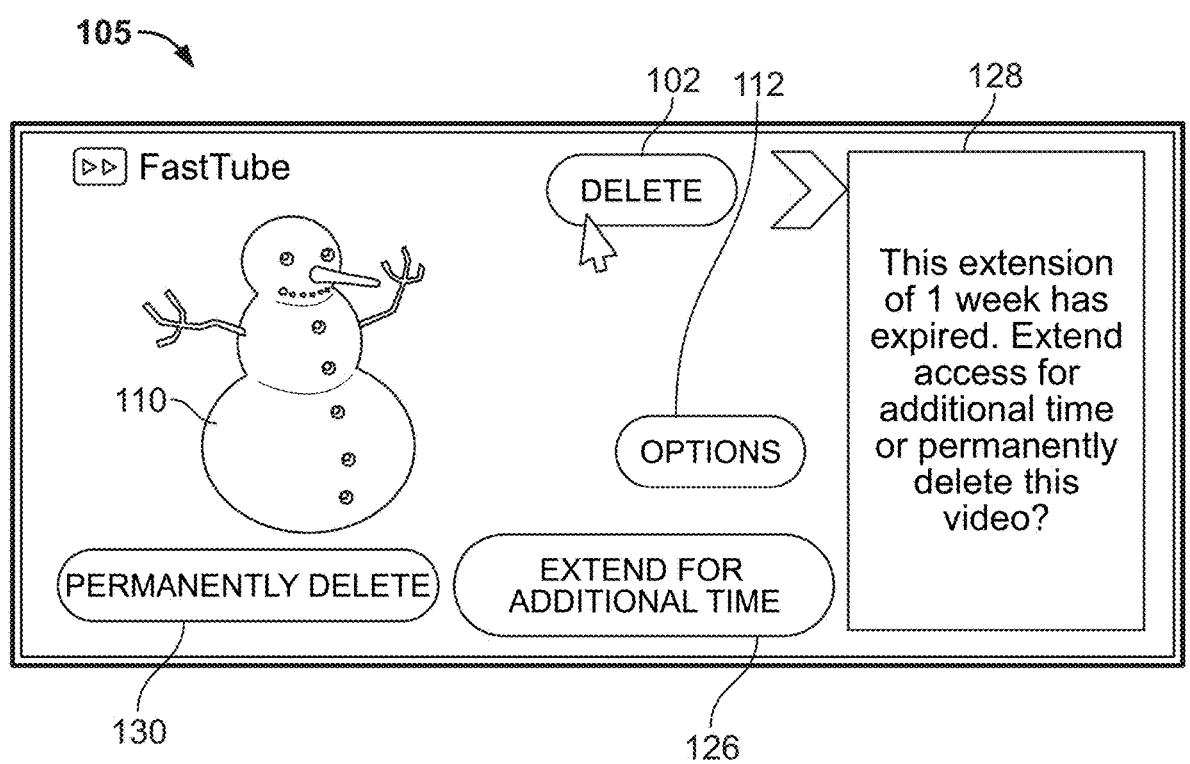

As shown in display screen 105 of FIG. 1D, once the predetermined time period has expired, a proposal to extend the predetermined time period is transmitted and subsequently displayed by the user's device. For example, notification 128 may be presented to the user upon expiration of the predetermined period, and may indicate that although the predetermined time period has ended, such time period can still be extended for additional time, or alternatively the media content item may be permanently deleted. In some embodiments, the user may be given a certain amount of time to choose between option 126 to extend the period for additional time or option 130 to permanently delete the media content item, and the media content item can be deleted if the user does not make a choice before the certain amount of time elapses. A selection of option 126 in screen 105 may cause screen 107 shown in FIG. 1E to be launched, to enable the user to select a period of additional time to be added to the predetermined time period. The extension time period can be selected by the user from pre-existing choices and input by the user, or be set based on an optimized time period.

While FIGS. 1A-E depict exemplary display screens that may be provided to a user (e.g., a user from which the server received uploaded media content items) display of FIGS. 2A-D depict exemplary display screens that may be provided to consumer users (e.g., a user whose access to the media content item is to be extended).

Figure 2A:
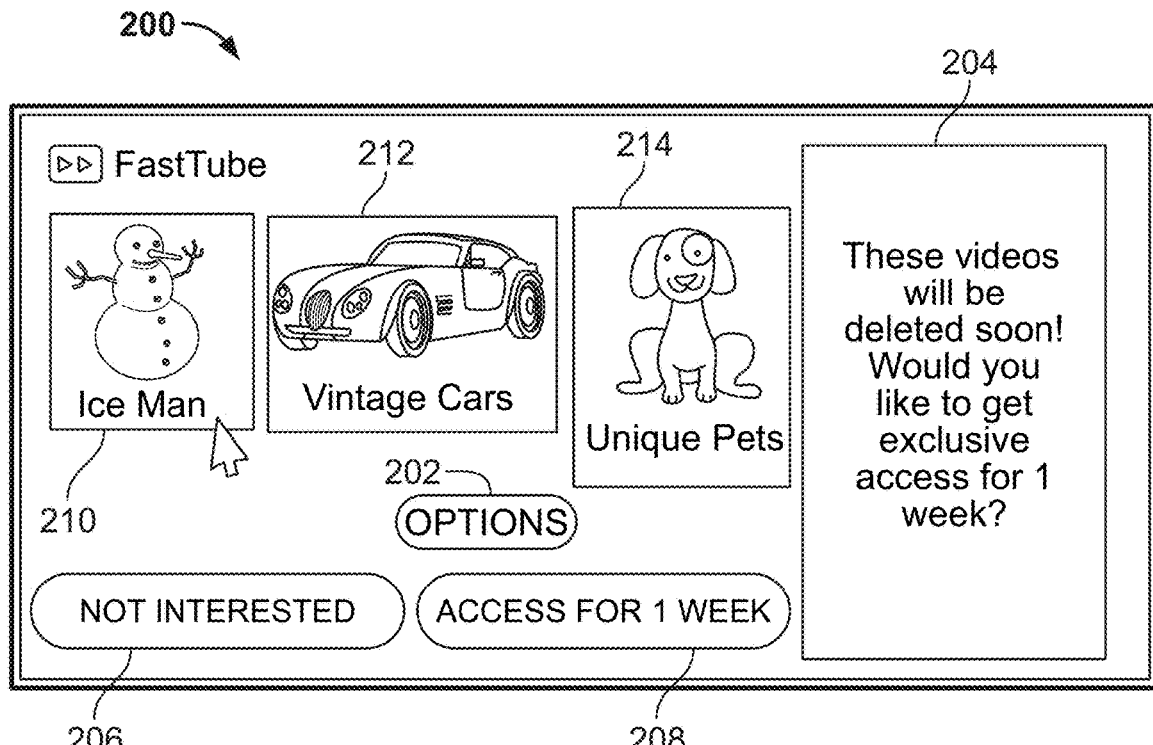
FIGS. 2A-2D show illustrative display screens that may be used to present an offer to extend availability of media content items, in accordance with some embodiments of the disclosure.

As shown in the example of FIG. 2A, which in some embodiments may be displayed to the consumer user only in the case that a proposal to extend access has been transmitted (e.g., upon receiving instruction from the uploading user to do so), a display 200 of a user device in communication with the server can be provided. In some embodiments, even if an instruction to permanently delete the media content item has been received from the uploading user, an offer to extend access to a media content item can be offered to some users. The display 200 includes an offer to extend availability of a media content item. For example, a consumer user (e.g., having access to the media content item on the server) may be presented with a notification 204 including an offer to extend availability of the media content item(s), when the consumer user is identified (e.g., based on a determination performed by the deletion management application) as likely to view the media content. This notification 204 may be provided to the consumer user in response to another user (e.g., the user that uploaded the media content item) requesting to delete the media content item, and the notification can include an indication of how long availability can be extended were the user to accept the offer. For example, the consumer user may be identified as likely to be interested in media content items 210, 212, 214 (titled "Ice Man," "Vintage Cars," "Unique Pets," respectively, in this example), and such media content items 210, 212 and 214 may be displayed. Selection to extend access to any combination of the media content items 210, 212, 214 for the predetermined time period can be received from the user. Although the predetermined time period is shown as "1 week" for each media content item in FIG. 2A, it should be appreciated that any period of time may be used, and that each media content item may have a different (or the same) predetermined period of time associated with it. The user can indicate which media content item(s) he or she is interested in by, for example, selecting the media content item (e.g., selecting media content item 210 with the cursor as shown in FIG. 2A) and then selecting option 208 to accept the offer to extend availability of media content item 210 for a week. The offer can additionally or alternatively be sent to an email address associated with a user profile of the user. Alternatively, the user can indicate that he or she is not interested in extending availability of the media content item by selecting option 206.

Upon receiving acceptance of the offer to extend availability of the media content item, the selected media content item can be made available to the user for the predetermined period of time, and inaccessible to other users. For example, for other users (e.g., among a plurality of users having access to content on the server) that either were not presented with the offer to extend availability because they were not identified as users likely to be interested in the content to be deleted, or declined the offer to extend availability, the selected media content item may be inaccessible (e.g., such users may not be permitted to access the media content item, and/or the media content item may become unsearchable to such users). For example, in some embodiments, access rights associated with user accounts (or access rights associated with the original media content file) for users may be modified to restrict such users from accessing the media content items.

In some embodiments, encryption may be applied to such media content items (e.g., by the deletion management application) such that user would not be permitted to access the content without an encryption key (e.g., generated by the system and provided only to users that have accepted the offer to extend access). For example, an encryption key or other unique access control code may be generated and associated with the content, and the server may transmit such encryption key or unique access control code to a user device associated with a user that has accepted an offer to extend access to the media content item. In some embodiments, to make the media content item inaccessible to certain users, certain tags or keywords may be associated with the media content item, and an attempt by the restricted user to search (e.g., via a search interface) for content associated with such keywords may be unsuccessful.

Figure 2B:
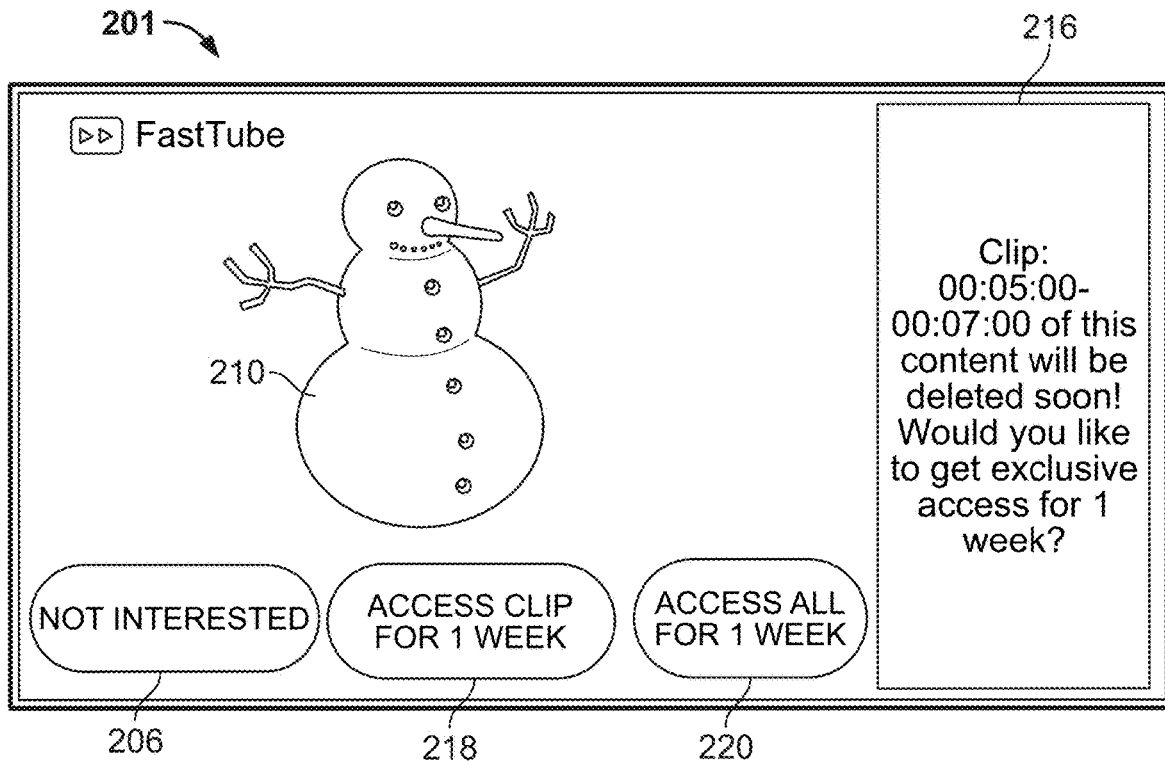

In some embodiments, an offer to extend availability to a portion of a media content item can be transmitted and presented, as shown in the example of FIG. 2B. For example, even if the user is identified as unlikely to be interested in the entire media content item, it may be the case that the user is identified as likely to be interested in a particular portion of the media content item. Notification 216 can indicate to the user having access to content on the server an offer to extend availability of a particular portion (e.g., a clip at 00:05:00-00:07:00) of the media content item 210). Upon receiving selection of option 218, availability of only the particular portion of the media content item 210 can be extended for the predetermined period (e.g., one week), and can also provide option 220 to extend availability of the entire media content item for the predetermined period. Alternatively, only option 218 among options 218 and 220 may be provided for selection, in a case where the user is identified as unlikely to be interested in the entire media content item, but is identified as likely to be interested in a particular portion of the media. The display 201 may also provide a proposal to extend multiple clips of a media content item, such as when the user is likely to be interested in each of such clips. Such aspects can enable a prospective user to gain access to media that he or she may have missed or overlooked, and which would be deleted unless consumed.

Various methods can be employed to identify a user that is likely to be interested in a media content item (or a portion thereof) during the delay duration. For example, the user can be associated with a media content item viewing profile, which can include usage history data for a particular user (e.g., search or consumption history, manual choice of genres/keywords, specific queries from the user, indications by the user of liking or disliking certain media content items, media content items that the user reviewed or commented on). When a media content item is selected for deletion, the media content item viewing profile of the user can be retrieved, metadata of the profile can be compared with metadata of the media content item stored on the server, and if there is a match between such metadata, it can be determined that the user is likely to be interested in the media content item during the delay duration. A similar process used to recommend media content items to users (e.g., which can be based on the user's media content item viewing profile) prior to receiving a deletion instruction may be used to identify users likely to be interested in the media content item during the buffer period. In some embodiments, if a user has already viewed a media content item (or portion thereof), the user may not be identified as a user likely to be interested in the media content item (or the portion thereof). However, if it is determined that the user has a history of re-watching the same media content item, based on the user's media content item viewing profile, the user can be included in the number of users likely to access the media content item. Systems and methods for predicting user consumption are discussed in greater detail in connection with Bennett et al., U.S. Patent Publication No. 2019/0005513 A1, published Jan. 3, 2019, which is hereby incorporated by reference herein in its entirety.

In some embodiments, the media content items can be provided to relevant, identified users for subscription, download or purchase for the predetermined time period (i.e., the buffer period), and if a request to purchase or subscribe to the media content item is received from the user, a part of the subscription cost can be shared with the user that uploaded the media content item. For example, the price of the media may increase as the buffer time getting closer to finishing or it may decrease based on irrelevant portions (e.g., that the user is determined as unlikely to be interested in), which can be edited out of the media content item. In addition, a consumer user accepting an offer to extend availability of only a portion of a media content item may be charged less than a consumer user accepting an offer to extend availability of the entire media content item. That is, the cost may depend on the runtime of the media consumed by the user. The uploading user may also receive compensation (e.g., a percentage of fees paid by the consumer user) when the consumer user views the media content item. In a case where an uploading user uploads content and the availability of such content is extended, the uploading user may receive additional compensation (e.g., a percentage of the fees paid by the consuming user) to incentivize extending access to content prior to deletion. In addition, cost to a consumer user may increase based on the elapsed buffer time (until the media is completely removed from the site or channel), e.g., the cost of the media may increase as the remaining buffer time decreases. Such aspects can enable an uploader to earn revenue from media deleted by him or her, and/or a media provider (e.g., a streaming or download channel) to earn revenue from media that is lined up for deletion or that has been conditionally deleted.

Figure 2C:
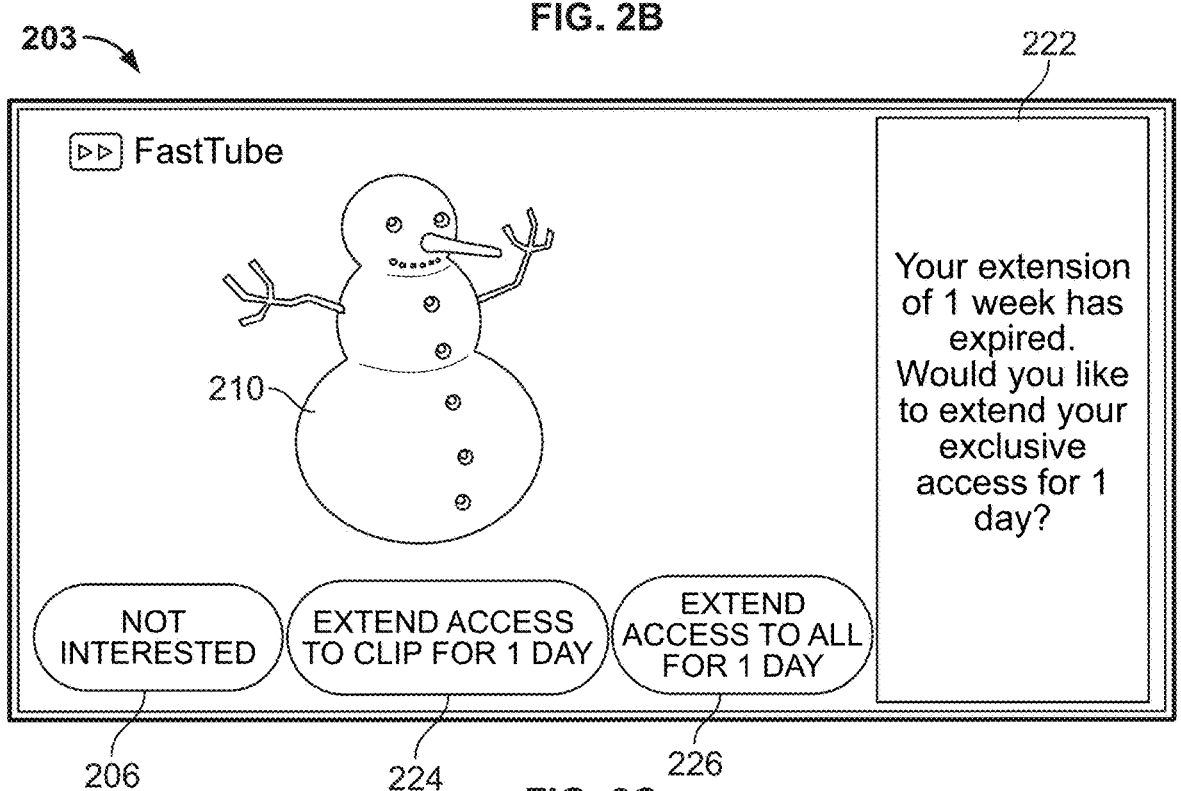

As shown in the example of FIG. 2C, the user (e.g., the consumer user) is presented with a notification 222 that his or her delay duration has expired. In some embodiments, the user may be given the opportunity to extend availability of the media content item beyond the predetermined time period. For example, acceptance of an offer to extend availability for the predetermined period may have been initially received from the user, but the user may have been unable to find time to access the media during such period, or the user enjoyed the content so much that he or she would like to access the media content item again. Selection of option 224 received from the user can extend availability of a particular clip or portion of the media content item for additional time (e.g., one day) or selection of option 226 can extend availability of the entire media content item for the additional time. The user that wishes to extend availability beyond the predetermined time period may be required to pay an associated fee in order to access the content. If the user is not interested in extending availability beyond the predetermined time period, he or she may select option 206 and the content may be deleted. However, in some embodiments, if there are other users that wish to extend the availability of the media content item beyond the predetermined time period, the media content item may not yet be deleted, even if selection of option 206 is received from the user, although the media content item may be inaccessible to the user that indicated that he or she is not interested in the extension.

Figure 2D:
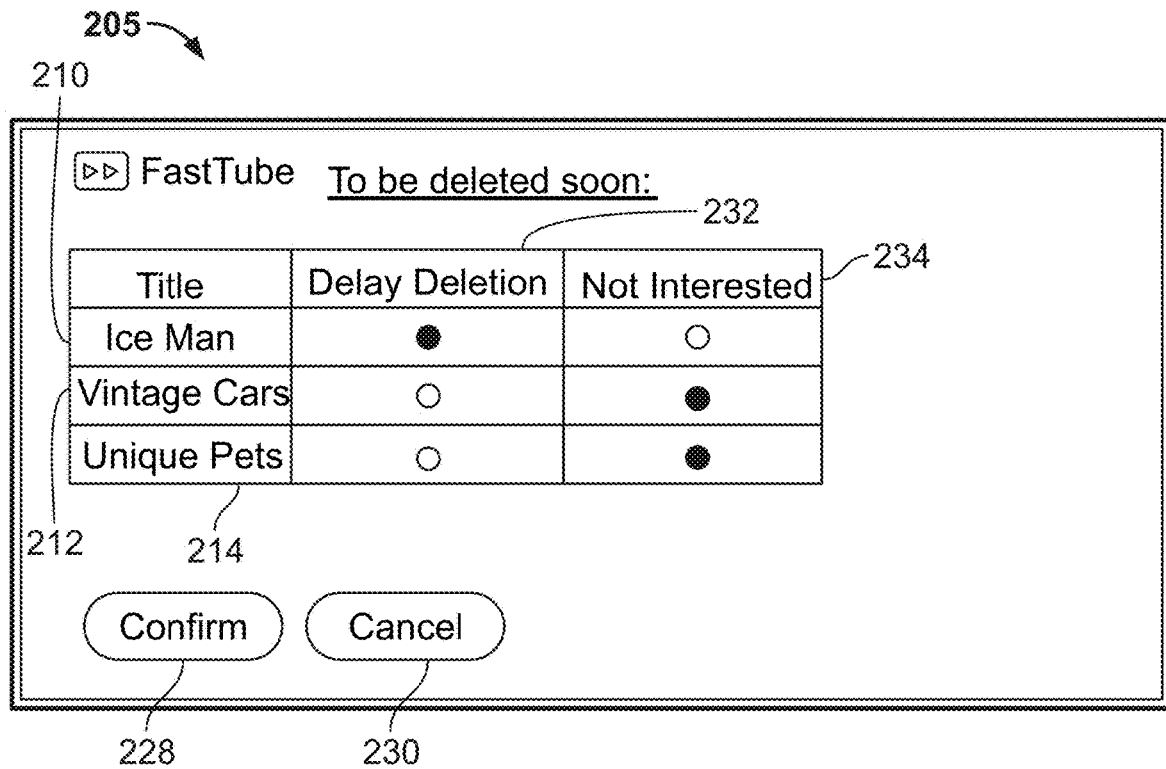

As shown in FIG. 2D, the user is presented with a display screen 205, which shows a list of media content items that will not be available after a predetermined time period. In some embodiments, this menu may be presented in response to the user selecting a "last chance" menu option. For example, the screen 205 may display media content items 210, 212 and 214, which the user may have been identified as likely to view during the predetermined period. Selection of option 232 received from the user indicates which media content items the user would like to extend availability of, and selection of option 234 received from the user indicates media content items that he or she is not interested in extending the availability of. In this example, an indication of a desire to extend availability of media content item 210 ("Ice Man"), but not media content item 212 ("Vintage Cars") or media content item 214 ("Unique Pets") has been received from the user. Confirmation to extend access, e.g., selecting the option 228 on the screen 205, is received from the user. In some embodiments, the user may be provided with suggestions of alternative sources or platforms at which the media content items may be obtained, in a case where deletion is carried out.

As referred to herein, the terms "media content item" and "content" should be understood to mean an electronically consumable user content item, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

Instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, USB drive, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "media content item provider equipment," "media content item consumer equipment," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, an augmented reality (AR) or virtual reality (VR) device, a local media server a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. Deletion management applications may be provided as online applications (i.e., provided on a website), or as stand-alone applications or clients on user equipment devices. Various devices and platforms that may implement deletion management applications are described in more detail below.

Figure 3:
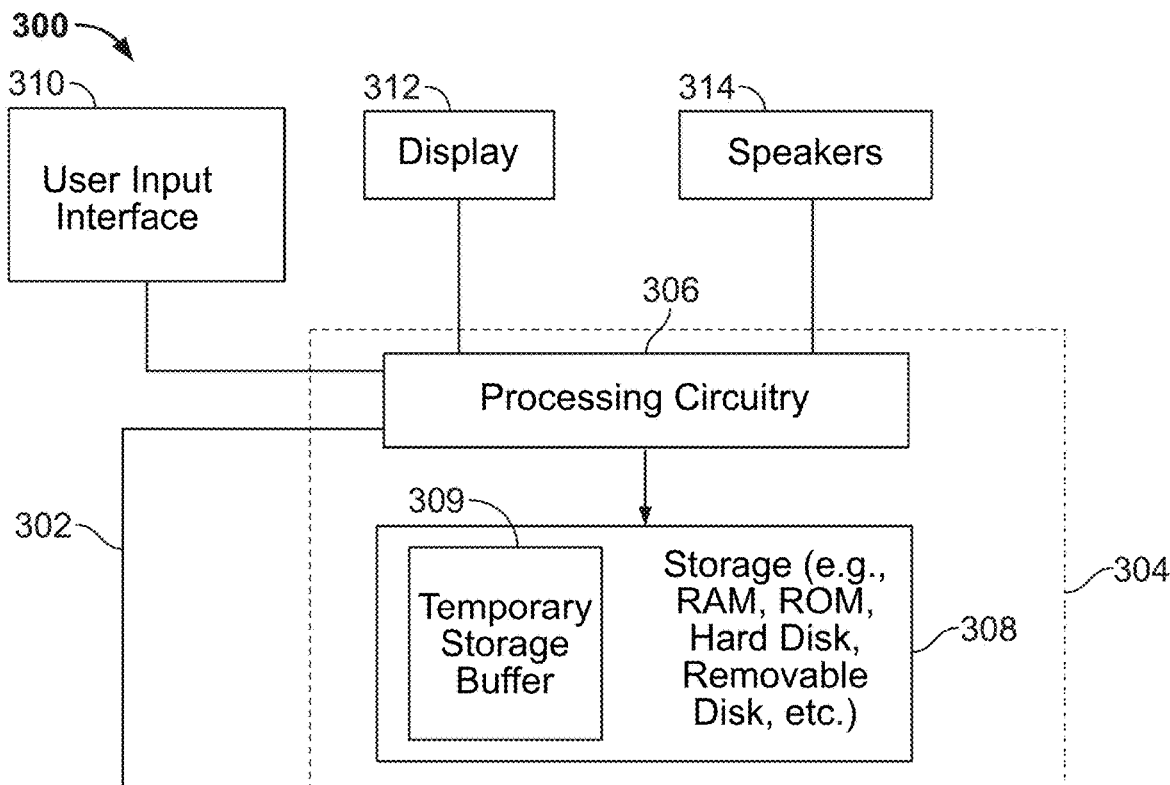
FIG. 3 is a block diagram of illustrative media content item provider equipment or media content item consumer equipment, in accordance with some embodiments of the disclosure.
Figure 4:
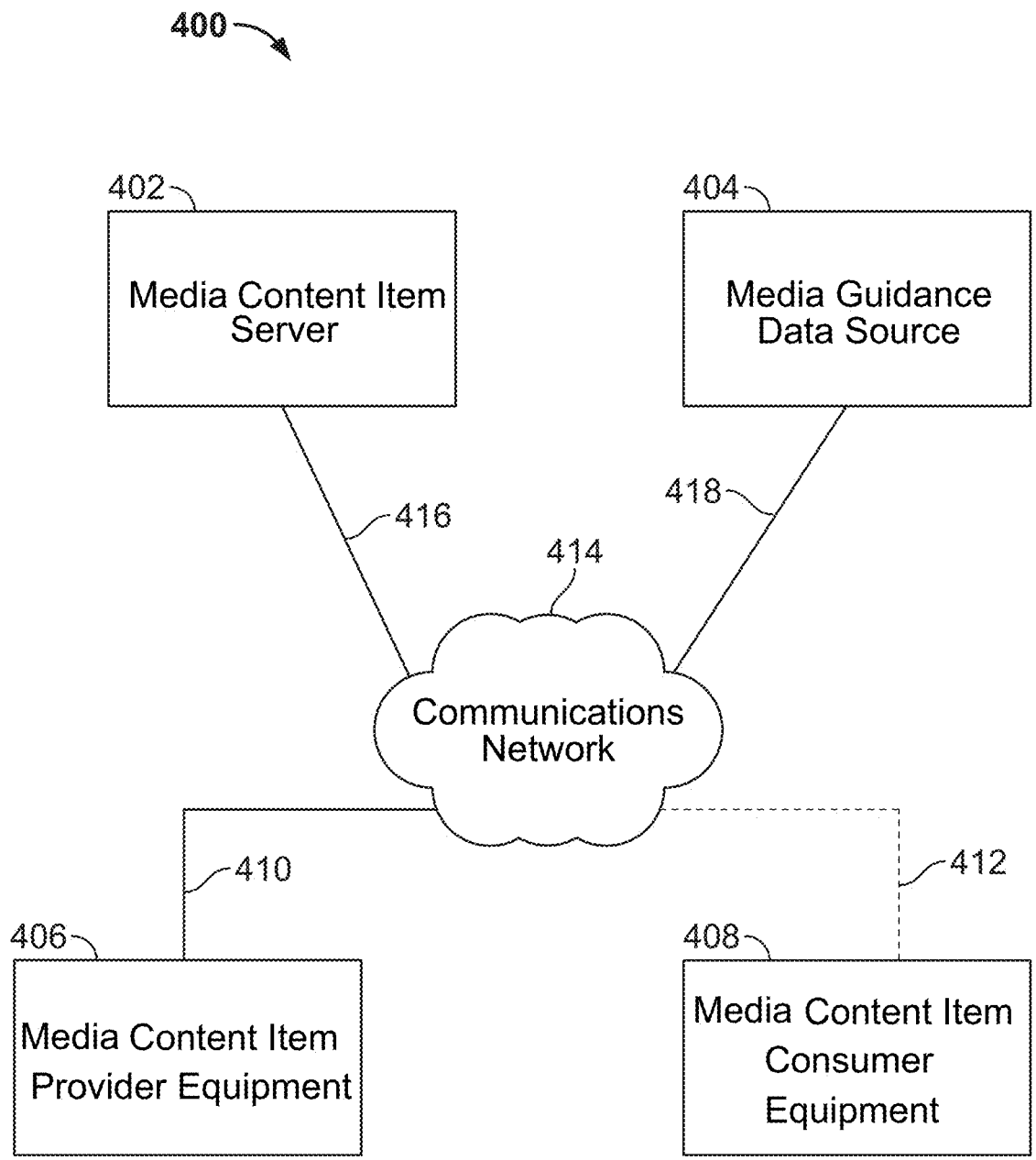
FIG. 4 is a block diagram of an illustrative system in accordance with some embodiments of the disclosure.

FIG. 3 is a block diagram of illustrative media content item provider equipment or media content item consumer equipment, in accordance with some embodiments, and FIG. 4 is a block diagram of an illustrative system (e.g., including such media content item provider equipment 406 and media content item consumer equipment 408). Users may access media content items and a deletion management application (e.g., running on server 402 and/or on media content item provider equipment 406, media content item consumer equipment 408), and its display screens described above, from one or more of their user equipment devices (e.g., media content item provider equipment 406, and/or media content item consumer equipment 408).

As shown in FIG. 3, user equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. In some embodiments, all or a portion of the media content item subject to the delayed deletion can be stored in a specialized or temporary or intermediate memory 309 (e.g., a cache or a buffer memory). For example, the media content item may only need to be retrieved for a short period of time (e.g., the predetermined period of time), and the media content item can be temporarily stored at a location (e.g., in the cache or at random-access memory of the storage device) of the server that is readily and quickly accessible, to enhance latency and performance of the system.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a deletion management application stored in memory (i.e., storage 308). Specifically, control circuitry 304 may be instructed by the deletion management application to perform the functions discussed above and below. For example, the deletion management application may provide instructions to control circuitry 304 to generate the above-described displays. In some implementations, any action performed by control circuitry 304 may be based on instructions received from the application.

In client/server-based embodiments, control circuitry 304 may include communications circuitry suitable for communicating with media content item server 402 or other networks or servers. The instructions for carrying out the above-mentioned functionality may be stored on the media content item server 402. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as content data and content application data that are described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and down-converting content into the preferred output format of the user equipment device 400. Control circuitry 304 may also include digital-to-analog converter circuitry and analog-to-digital converter circuitry for converting between digital and analog signals. The tuning and encoding circuitry may be used by the user equipment device to receive and to display, to play, or to record content. In some embodiments, the control circuitry may include an HD antenna.

In one embodiment, speakers 314 may be provided as integrated with other elements of user equipment device 300 or may be stand-alone units. The audio and other content displayed on display 312 may be played through speakers 314. In some embodiments, the audio may be distributed to a receiver (not shown), which processes and outputs the audio via speakers 314.

The deletion management application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the deletion management application is a client/server-based application. Data for use by a thick or thin client implemented on user equipment device 300 is retrieved on-demand by issuing requests to a server remote to the user equipment device 300. In one example of a client/server-based deletion management application, control circuitry 304 runs a web browser that interprets web pages provided by a remote server (e.g., server 402). For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the deletion management application is downloaded and interpreted or otherwise run by an interpreter or virtual machine (run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the application may be, for example, encoded and transmitted in an MPEG-2 object carousel with the MPEG audio and video packets of a program.

The user equipment devices may be coupled to communications network 414. Communications network 414 may be one or more networks including the Internet, a mobile phone network, mobile voice or data network (e.g., a 4G, 5G or LTE network), cable network, public switched telephone network, or other types of communications network or combinations of communications networks.

The media content item server 402 may have a similar configuration to user equipment 300, although the server 402 may not include a user input interface, a display or speakers. The server may store and execute various software modules, which may be stored in storage of the server and executed via processing circuitry of the server, for implementing the media content item access functionality of the system 400. In some configurations, these modules may include natural language interface, information retrieval, search, machine learning, and any other modules for implementing functions of the system 400. The system also can include media guidance data source 404, which can represent any computer-accessible source of content, such as a storage for audio content, metadata, or, e.g., guidance information.

Figure 5:
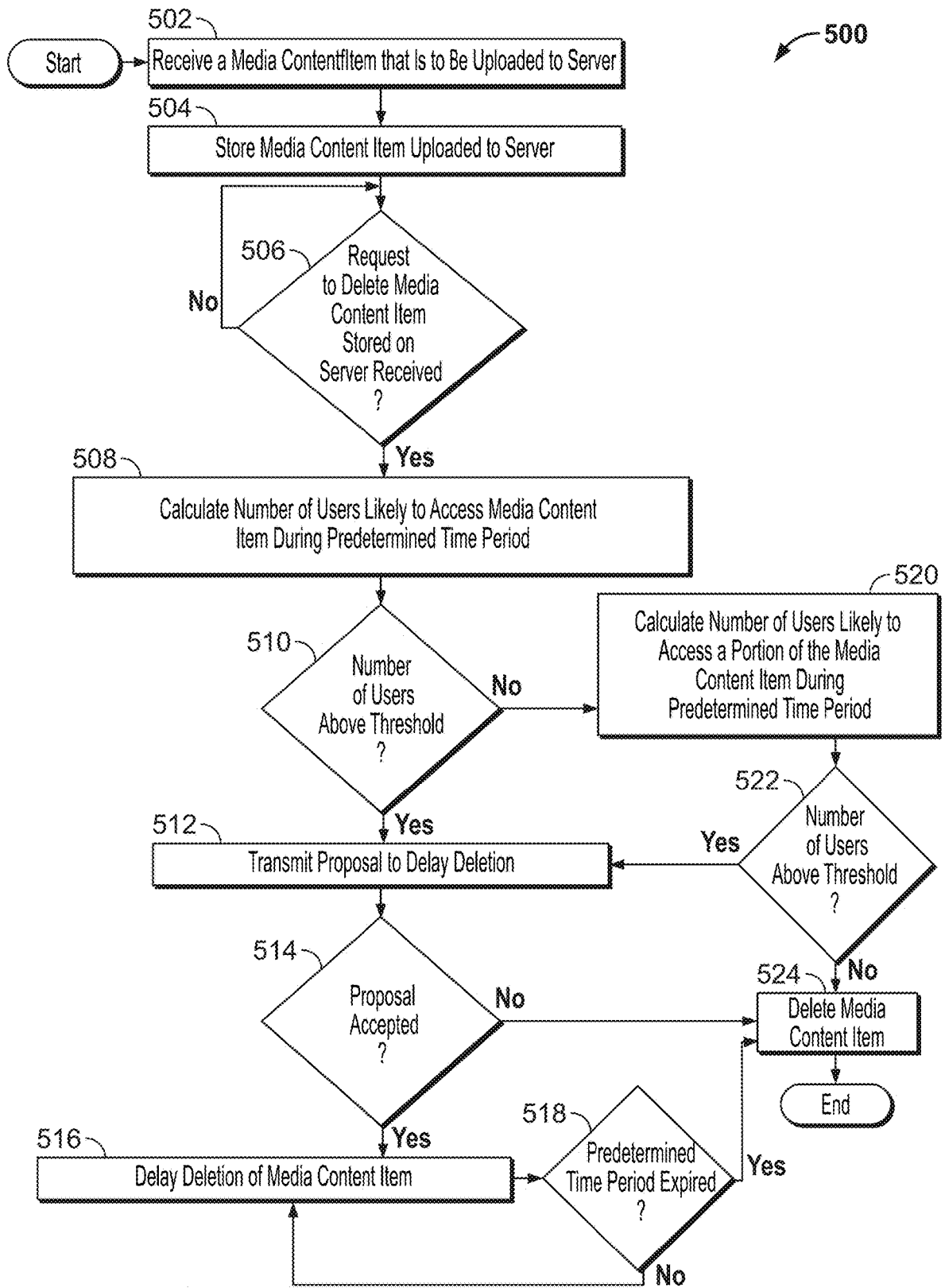
FIG. 5 is a flowchart of illustrative steps involved in transmitting a proposal to delay deletion of a media content item, in accordance with some embodiments of the disclosure.

FIG. 5 is a flowchart of illustrative steps in transmitting a proposal to delay deletion of a media content item, in accordance with some embodiments of the present disclosure. It should be noted that process 500 or any step thereof could be performed on, or provided by, any of the devices shown in FIGS. 3-4, and can incorporate various user interfaces (e.g., displays screens of FIGS. 1A-1E and/or 2A-2D). For example, process 500 may be executed by control circuitry 304 (FIG. 3) of the user equipment 300 and/or control circuitry of the media content item server 402, as instructed by a deletion management application that may be implemented on media content item server 402 and/or media content item provider equipment 406, and/or media content item consumer equipment 408 (FIG. 4), in order to distribute control of deletion management application operations for a target device among multiple user devices. In addition, one or more steps of process 500 may be incorporated into or combined with one or more steps of any other process or embodiment (e.g., process 600 of FIG. 6, process 700 of FIG. 7, process 800 of FIG. 8, process 900 of FIG. 9).

At step 502, media content item server 402 may receive a media content item that is to be uploaded to the server (e.g., from media provider equipment 406), and, at step 504, the media content item may be stored on the server 402. The server 402 may have received the uploaded media content item from a user having access to media on the server. Alternatively, an automated process (e.g., a content aggregator application) may be employed to scrape, crawl and/or browse the web, to extract media content from a variety of online sources and aggregate such content at the server 402. For example, such automated process may specify certain rules to aggregate certain types of content and to exclude other types of content from aggregation.

At step 506, after a certain period of time, the server may receive a user request to delete the media content item stored on the server 402 (e.g., via option 102 of FIG. 1A). For example, the user may wish to move the media content item to another platform, or may not be satisfied with the amount of views received of or interaction occurring with the media content item from other users. When a request to delete the media content item stored on the server is received, the process proceeds to step 508, where the number of users likely to access the media content item during a predetermined time period is calculated. If a request to delete the media content item from the server 402 is not received, the media content item remains available to all users, and the system waits to receive such a request from the user.

Figure 7:
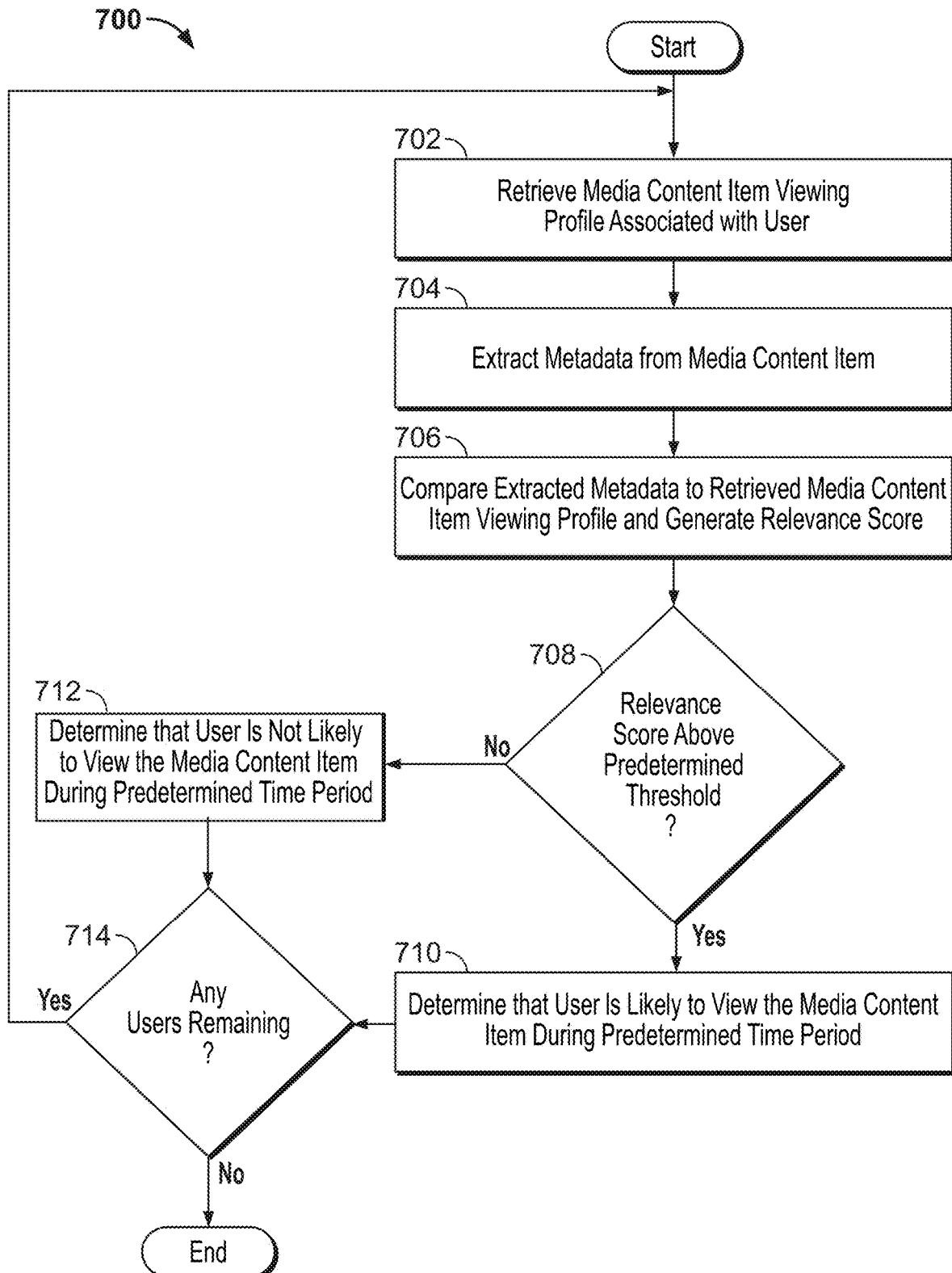
FIG. 7 is a flowchart of illustrative steps involved in determining whether a user is likely to view a media content item that is requested to be deleted, in accordance with some embodiments of the disclosure.

At step 508, once the request to delete the media content item stored on the server 402 is received, the number of users likely to access the media content item is calculated, as shown, for example, in more detail in FIG. 7. At step 510, the calculated number of users likely to access the media content item is then compared to a predetermined number. Such predetermined number can be selected by the uploading user. For example, the user may decide that he or she does not wish to delay the deletion of the media content item unless 2,000 users are likely to view the media content item within the predetermined period (e.g., one week), and the predetermined number of users can be adjusted accordingly, based on an entry received from the user. Alternatively, the predetermined number of users can be automatically set based on, for example, an average amount of views that media content items regularly receive over certain periods of time.

At step 510, the calculated number of users is compared to the threshold number of users (e.g., 10% of users having access to the media content item). At step 512, if the calculated number of users exceeds the threshold number, a proposal to delay deletion is transmitted, and can be displayed to the uploading user. For example, the transmitted proposal to delay may be displayed on the user device as depicted by element 104 of FIG. 1A. At step 520, if the calculated number of users does not exceed the threshold number, the number of users likely to access a portion of the media content item is calculated.

At step 522, it may be determined whether the number of users likely to access the portion of the media content item exceeds the predetermined number of users. At step 512, upon determining that the number of users exceeds such threshold number, the proposal to delay deletion may be transmitted to the user device of the uploading user (e.g., notification 114 of FIG. 1B). That is, even if the number of users likely to view the entire media content item does not exceed the predetermined number of users, the proposal to delay deletion of the media content item may still be transmitted if it is determined that the number of users likely to access the portion of the media content item exceeds the predetermined number of users. The predetermined number of users required to be exceeded in order to transmit a proposal to delay deletion of the portion of the media content item may be the same as, or different from, the predetermined number of users required to be exceeded in order to transmit a proposal to delay deletion of the entire media content item.

At step 524, if it is determined that the number of users likely to view the portion of the media content item is less than the predetermined number, the media content item may be deleted from the server 402. In some embodiments, the media content item can be deleted from the server, without transmitting any proposals to delay deletion, only after the determination that both the entire media content item and any portion of the media content item are unlikely to be viewed by the predetermined number of users. At step 514, a determination is made as to whether the proposal to delay deletion (of the entire media content item and/or a portion thereof for the predetermined period) has been accepted. At step 516, if the proposal is accepted, deletion of the media content item can be delayed. At step 524, the media content item may be deleted from the server, if the proposal is declined, based on a response received from the user (e.g., upon receiving selection of option 106 of FIGS. 1A-1B). In some embodiments, if, after a certain period of time, an answer is not received from the user as to whether the proposal is accepted, the media content item can be deleted from the server.

At step 518, it is determined whether a predetermined time period has expired. The predetermined period of time may be set by the uploading user or may be set automatically. The time T when an option to delete the media content item is received by the user can be recorded at the time of the upload, and the predetermined period of time (e.g., the buffer time B) can be assigned upon acceptance of the proposal to delay deletion. When the predetermined time period has expired (e.g., at time T+B), the media content item may be deleted from the server 402. At step 518, if the predetermined period has not yet expired, delay of the deletion of the media content item is continued (e.g., until the predetermined period of time expires).

Figure 6:
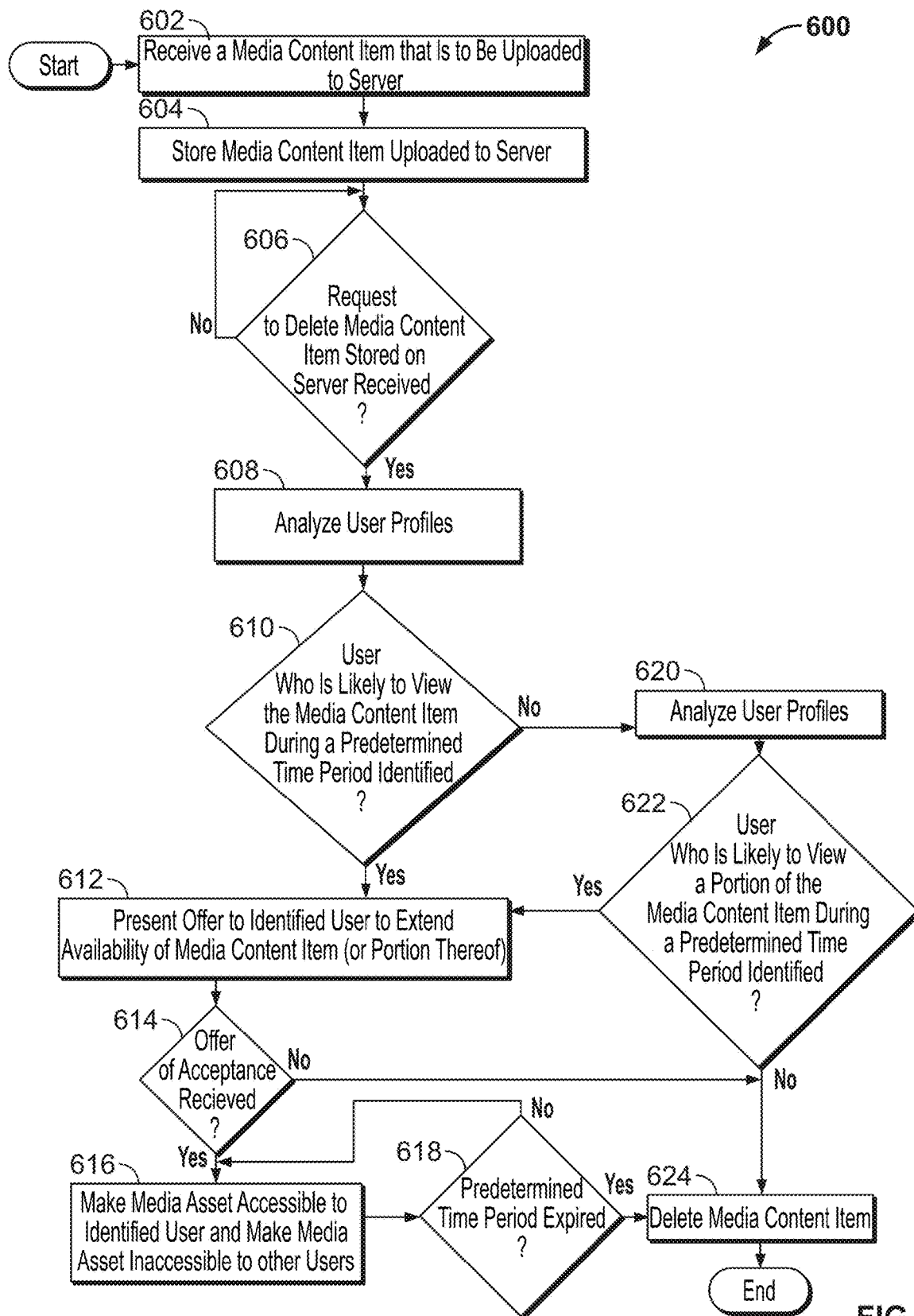
FIG. 6 is a flowchart of illustrative steps involved in presenting to an identified user an offer to extend availability of the media content item, in accordance with some embodiments of the disclosure.

FIG. 6 is a flowchart of illustrative steps in presenting to an identified user an offer to extend availability of the media content item, in accordance with some embodiments of the present disclosure. It should be noted that process 600 or any step thereof could be performed on, or provided by, any of the devices shown in FIGS. 3-4 and can incorporate various user interfaces (e.g., displays screens of FIGS. 1A-1E and/or 2A-2D). For example, process 600 may be executed by control circuitry 304 (FIG. 3) of the user equipment 300 and/or control circuitry of the media content item server 402, as instructed by a deletion management application, which may be implemented on media content item server 402 and/or media content item provider equipment 406, and/or media content item consumer equipment 408 (FIG. 4) in order to distribute control of deletion management application operations for a target device among multiple user devices. In addition, one or more steps of process 600 may be incorporated into or combined with one or more steps of any other process or embodiment (e.g., process 500 of FIG. 5, process 700 of FIG. 7, process 800 of FIG. 8, process 900 of FIG. 9).

At step 602, media content item server 402 can receive a media content item that is to be uploaded to the server (e.g., from media provider equipment 406), and at step 604, the media content item is stored on the server 402. The server 402 may have received the uploaded media content item from a user having access to media on the server. Alternatively, an automated process (e.g., a content aggregator application) may be employed to scrape, crawl and/or browse the web, to extract media content from a variety of online sources and aggregate such content at the server 402. For example, such automated process may specify certain rules to aggregate certain types of content and to exclude other types of content from aggregation.

After a certain period of time, a deletion request pertaining to the media content item stored on the server 402 may be received from the user (e.g., via option 102 of FIG. 1A). For example, the user may wish to move the media content item to another platform or may not be satisfied with the amount of views received or interaction with the video from other users. At step 606, it is determined whether a request to delete the media content item stored on the server is received. At step 608, if such request is received, media content item viewing profiles may be analyzed. At step 606, if the user does not request to delete the media content item from the server 402, the media content item remains available to all users, and the system waits to receive such a request from the user.

At step 608, once the request to delete the media content item stored on the server 402 is received, user profiles are analyzed, as shown, for example, in more detail in FIG. 7. At step 610, based on the analysis of the user profile, it is determined whether the user is likely to view the media content item requested (e.g., by the uploading user) to be deleted during the predetermined time period. At step 610, it may be determined that the user is likely to view the media content item requested to be deleted during the predetermined time period. At step 612, the offer to extend availability of the media content item may be presented to the user (e.g., notification 204 of FIG. 2A). The user may be presented with multiple offers to extend availability of multiple media content items that the user is determined to be likely to view, such as in a single screen, for example. At step 620, if it is determined that the user is unlikely to view the media content item requested to be deleted during the predetermined time period, the user profiles can be analyzed to identify a user likely to view a portion of the media content item during a predetermined time period, as shown, for example, in more detail in FIG. 7.

At step 622, it is determined whether the user is likely to access the portion of the media content item during the predetermined period. At step 612, upon determining that the user is likely to access the portion of the media content item, an offer to extend availability of the media content item can be transmitted to the user's device, and, upon receipt by the user's device, displayed to such user (e.g., notification 216 of FIG. 2B). That is, even if the user is not identified as being likely to view the entire media content item, the proposal to delay deletion of the media content item may still be transmitted if it is determined that the user is likely to access a portion of the media content item.

At step 624, if it is determined that the user is unlikely to view the portion of the media content item during the predetermined time period, the media content item may be deleted from the server 402. In some embodiments, the media content item is deleted from the server, without transmitting any proposals to delay deletion, if the user is deemed unlikely to be interested in both the entire media content item and any portion of the media content item. The portion of the media content item can constitute any clip of the media content item having a duration shorter than that of the entire media content item.

At step 614, a determination may be made as to whether the offer to extend availability (of the entire media content item or a portion thereof for the predetermined period) has been accepted. At step 616, if the offer is accepted (e.g., via options 218 or 220 of FIG. 1B), the media content item can be made accessible to the identified user and inaccessible to other users, but if the proposal is declined (e.g., via option 206 of FIG. 2A or FIG. 2B) the media content item may be deleted from the server. In some embodiments, if an answer is not received from the user as to whether the offer is accepted, after a certain period of time, the media content item can be deleted from the server.

At step 618, it is determined whether the predetermined time period (e.g., the buffer time B) has expired. The time T when the request for deletion of the media content item is received from the user can be recorded, and when the predetermined time period has expired (e.g., at time T+B), the media content item may be deleted from the server 402. At step 616, if the predetermined period has not yet expired, the media content item may remain accessible to the user and inaccessible to other users, e.g., other users identified as unlikely to view the media content item during the predetermined time period, or that decline an offer to extend availability of the media content item, may not be permitted to access the media content item, and/or the media content item may become unsearchable as to such users.

FIG. 7 is a flowchart of illustrative steps in determining whether a user is likely to view a media content item that is requested to be deleted, in accordance with some embodiments of the present disclosure. It should be noted that process 700 or any step thereof could be performed on, or provided by, any of the devices shown in FIGS. 3-4 and can incorporate various user interfaces (e.g., display screens of FIGS. 1A-1E and/or 2A-2D). For example, process 700 may be executed by control circuitry 304 (FIG. 3) of the user equipment 300 and/or control circuitry of the media content item server 402, as instructed by a deletion management application, which may be implemented on media content item server 402 and/or media content item provider equipment 406, and/or media content item consumer equipment 408 (FIG. 4), in order to distribute control of the deletion management application operations for a target device among multiple user devices. In addition, one or more steps of process 700 may be incorporated into or combined with one or more steps of any other process or embodiment (e.g., process 500 of FIG. 5, process 600 of FIG. 6, process 800 of FIG. 8, process 900 of FIG. 9).

At step 702, in order to analyze user profiles and identify one or more users likely to view, during a predetermined time period, the media content item requested to be deleted, the media content item viewing profile of the user can be retrieved. The media content item viewing profile may be stored on, for example, server 402, and can include usage history data for a particular user (e.g., search or consumption history, manual choice of genres/keywords, specific queries from the user, indications by the user of liking or disliking certain media content items, media content items that the user reviewed or commented on) that is tracked for the user and associated with an account of the user.

At step 704, metadata can be extracted from the media content item requested to be deleted. For example, text mining techniques (e.g., natural language processing, named entity recognition, coreference, sentiment analysis, semantic analysis, and other text mining techniques) can be performed on data associated with the media content item (e.g., a title of the media content item, audio and/or subtitles of the media content item, user comments and/or rating associated with the media content item) to extract relevant genres and keywords, and a design matrix of correlated keywords/genres can be generated. Systems and methods for text mining techniques are discussed in greater detail in connection with Malhotra et al., U.S. Pat. No. 10,503,832, issued Dec. 10, 2019, which is hereby incorporated by reference herein in its entirety. In addition, if the media content item contains various imagery, an image recognition module can be employed to extract correlated keywords and/or genres, and such images can be extracted in chronological order. For example, the control circuitry may execute an image recognition algorithm to analyze images (e.g., retrieved from a database) associated with specific keywords and/or genres. The control circuitry may compare those images with images of the media content item to determine the keywords and/or genres to be extracted. The number of users having access to the media content item can also be identified. In some embodiments, if a user has already viewed a media content item (or portion thereof), the user may not be identified as a user likely to be interested in the media content item (or a portion thereof). However, if it is determined that the user has a history of re-watching the same media content item, based on the user's media content item viewing profile, the user can be included in the number of users likely to access the media content item.

At step 706, the metadata extracted from the media content item can be compared to the metadata associated with the extracted media content item viewing profile of the user. For example, a relevance measure or relevance score can be computed based on a degree of match (e.g., a comparison between the matrix generated for the keywords and/or genre information extracted from the media content item). At step 708, it is determined whether the relevance measure or relevance score is higher than a predetermined value. At step 710, if it is determined that the relevance measure or relevance score is higher than the predetermined value, the metadata of the media content item and metadata of the media content item viewing profile of the user may be considered a match, and the user can be determined as likely to view the media content item during the predetermined time period. In some embodiments, a proportional cost constant can be assigned to the user based on a difference between the relevance score and a maximum possible relevance score value. For example, the closer the relevance score is to the maximum score, the higher the cost that may be charged to the user, and the cost constant can also be adjusted based on remaining buffer time for the user to consume the media content item prior to deletion. The cost constant can also be decreased if a user is being provided an offer to view a portion of the media content item rather than the entire media content item (e.g., irrelevant portions of the media content item can be deleted when providing the relevant portion to the user), and the cost can be displayed to the user prior to purchase. In some embodiments, the user may be interested in extending availability of only a portion of the media content item, and the user can request to extend availability of only the portion of the entire media content item instead of the offered entire media content item, and cost optionally charged to the user may be decreased accordingly.

At step 712, if the relevance score is determined not to be above the predetermined value, the user can be deemed unlikely to view the media content item during the predetermined time period. At step 714, it can be determined whether any other users having access to the media content item are likely to view the media content item during a predetermined period (e.g., the process of FIG. 7 can be repeated). For example, by repeating such process, it can be determined whether the number of users likely to be interested in accessing the content exceeds a predetermined number, as discussed in connection with FIG. 6.

Figure 8:
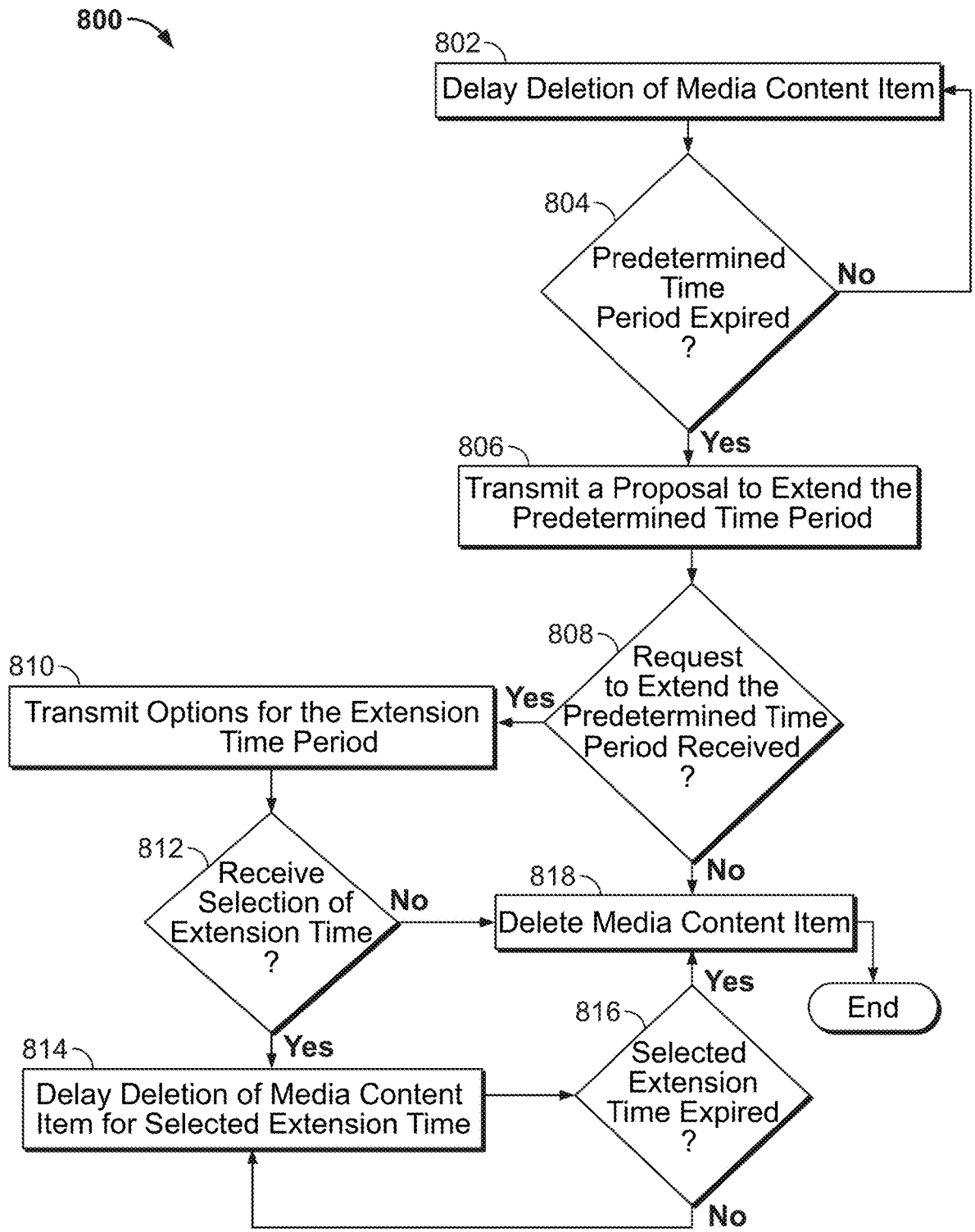
FIG. 8 is a flowchart of illustrative steps involved in transmitting a proposal to extend a predetermined time period, in accordance with some embodiments of the disclosure.

FIG. 8 is a flowchart of illustrative steps involved in transmitting a proposal to extend a predetermined time period, in accordance with some embodiments of the disclosure. It should be noted that process 800 or any step thereof could be performed on, or provided by, any of the devices shown in FIGS. 3-4 and can incorporate various user interfaces (e.g., displays screens of FIGS. 1A-1E and/or 2A-2D). For example, process 800 may be executed by control circuitry 304 (FIG. 3) of the user equipment 300 and/or control circuitry of the media content item server 402, as instructed by a deletion management application, which may be implemented on media content item server 402 and/or media content item provider equipment 406, and/or media content item consumer equipment 408 (FIG. 4) in order to distribute control of deletion management application operations for a target device among multiple user devices. In addition, one or more steps of process 800 may be incorporated into or combined with one or more steps of any other process or embodiment (e.g., process 500 of FIG. 5, process 600 of FIG. 6, process 700 of FIG. 7, process 900 of FIG. 9).

As shown in FIG. 8, it may have already been determined that the number of users likely to access the media content item requested for deletion exceeds the predetermined number. At step 802, deletion of the media content item can be delayed. At step 804, it is determined whether the predetermined time period has or has not expired. At step 806, if it is determined that such time period has not expired, delay of the deletion of the media content item can be continued. At step 806, if it is determined that the predetermined period has expired, a proposal may be transmitted (e.g., from the server to the user device, and the user device, upon receipt of the proposal, such as notification 104 shown in FIG. 1A, may display such proposal to the user who uploaded the media content item) to extend the predetermined time period. For example, the uploading user may have noticed that a significant number of users accessed the media content item during the predetermined period and may wish to extend the period to allow more users to access, or repeat users to re-access, the media content item.

Figure 1E:
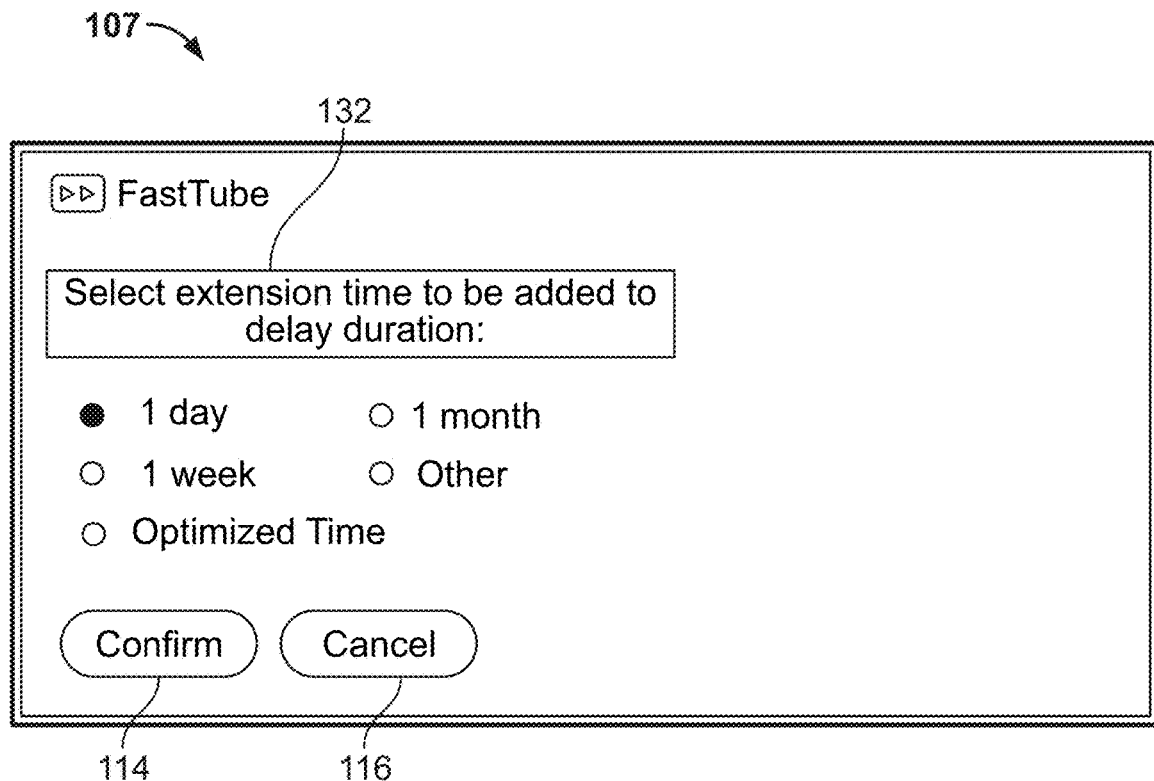

At step 808, it is determined whether a request to extend the predetermined time period has been received, in response to the proposal. At step 818, if a response has not been received, the media content item may be deleted. At step 810, the request to extend the predetermined time period has been received (e.g., option 108 of FIG. 1A is selected by the user), proposed options for the extension time period may be transmitted and displayed by the user device upon receipt, such as shown in FIG. 1E. The uploading user may decide how long he or she would like to extend the extension period for (e.g., 1 day, 1 week, 1 month, 1 week, or "other") or may select an optimized time option, which may take into account various factors in determining an ideal amount of time to extend the predetermined time period. For example, it may be determined, based on the respective media content item viewing profiles of the users likely to be interested in accessing the media content item, that such users consume media content items once every 10 days on average. If the predetermined time period was only 9 days, the system may determine that extending the period for one extra day would be optimal, to allow extra time for users that access media once every 10 days and have not yet accessed the media content item at issue, but at the same time avoid unnecessarily compromising performance or consuming storage space by retaining the media content item for too long a period, if it is determined as likely that extra time would not yield additional user interaction with the media content item (e.g., a cost-benefit analysis).

At step 814, if the selection of the extension time is received from the user, the predetermined period of time may be extended by such extension time. At step 818, if selection of the extension time is not received, the media content item may be deleted from the server 402. At step 814, if it is determined that the extension time has not yet expired, the delay of deletion of the media content item is continued. The uploading user may receive additional compensation (e.g., a percentage of the costs may be charged to consumer users to extend the predetermined time period) for extending the time period, e.g., based on how many users access the content during such time period. At step 818, once the selected extension time has expired, the media content item may be deleted from the server.

Figure 9:
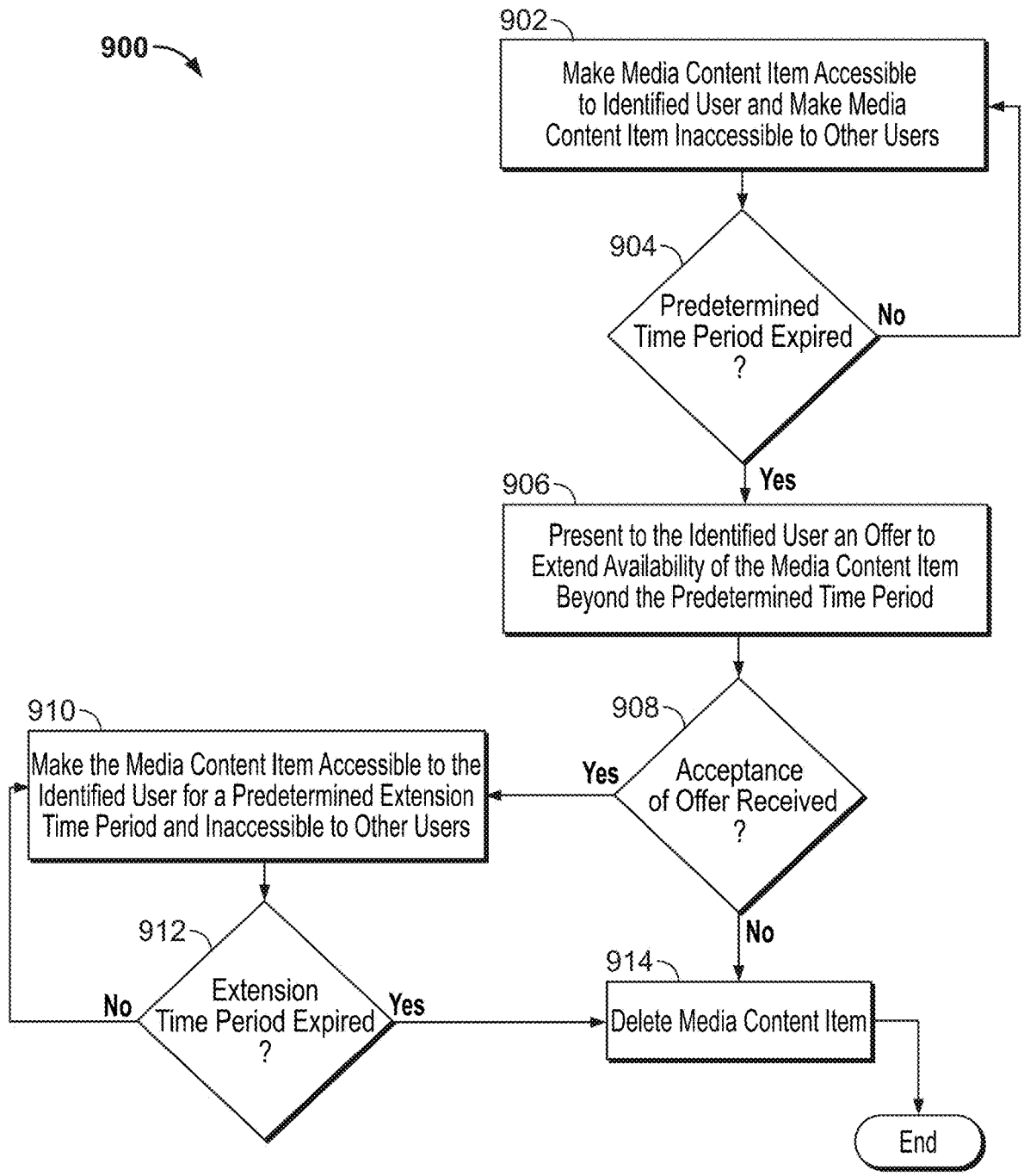
FIG. 9 is a flowchart of illustrative steps involved in presenting to an identified user an offer to extend availability of a media content item, in accordance with some embodiments of the disclosure.

FIG. 9 is a flowchart of illustrative steps involved in presenting to an identified user an offer to extend availability of a media content item, in accordance with some embodiments of the disclosure. It should be noted that process 900 or any step thereof could be performed on, or provided by, any of the devices shown in FIGS. 3-4 and can incorporate various user interfaces (e.g., displays screens of FIGS. 1A-1E and/or 2A-2D). For example, process 900 may be executed by control circuitry 304 (FIG. 3) of the user equipment 300 and/or control circuitry of the media content item server 402, as instructed by a deletion management application which may be implemented on media content item server 402 and/or media content item provider equipment 406, and/or media content item consumer equipment 408 (FIG. 4) in order to distribute control of deletion management application operations for a target device among multiple user devices. In addition, one or more steps of process 900 may be incorporated into or combined with one or more steps of any other process or embodiment (e.g., process 500 of FIG. 5, process 600 of FIG. 6, process 700 of FIG. 7, process 800 of FIG. 8).

As shown in FIG. 9, a user likely to view a media content item requested for deletion may have already been identified. At step 902, the media content item may be made accessible to the identified user while being inaccessible to other users. At step 904, if the predetermined period has not yet expired, deletion of the media content item may continue to be delayed and the identified user continues to have access to the media content item. At step 906, if the predetermined period has expired, an offer may be presented to the user to extend availability of the media content item beyond the predetermined time period (e.g., notification 204 of FIG. 2A). For example, an offer to extend availability of the media for the predetermined time period may have been previously received from the user, but, due to unforeseen circumstances, the user did not have enough time to access the content during such period, and now would like additional time to access the content.

At step 908, it is determined whether an acceptance of the offer to extend the availability of the media content item beyond the predetermined time period has been received, in response to the proposal. At step 914, if a response has not been received, the media content item may be deleted. At step 910, if the acceptance of the offer (e.g., via option 208 of FIG. 2A) to extend the availability of the media content item beyond the predetermined time period has been received, the media content item may be made accessible to the identified user while being made inaccessible to other users for the additional extension period. In some embodiments, the user may suggest an amount of time beyond the predetermined time period that he or she wishes to have access to the media content item, for confirmation by the uploading user, and a cost paid by the consumer user for the additional time can be adjusted accordingly.

At step 912, if the extension time period has not yet expired, the availability of the media content item for the user is continued. The user may be charged an additional amount for the extension of time beyond the predetermined time period and may be notified of the cost prior to accepting the offer to extend availability. Once the selected extension time has expired, the media content item may be deleted from the server.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for managing storage of a media content item on a server, the method comprising:
    storing a media content item on the server, wherein the media content item is accessible to a plurality of users;
    receiving a request to delete the media content item stored on the server;
    in response to receiving the request, calculating a number of users of the plurality of users that are likely to access the media content item during a predetermined time period;
    determining whether the calculated number of identified users exceeds a predetermined number; and
    in response to determining that the number of identified users exceeds the predetermined number, transmitting a proposal to delay the deletion.

2. The method of claim 1, wherein the proposal comprises the calculated number.

3. The method of claim 1, further comprising:
    in response to acceptance of the proposal, delaying the deletion of the media content item by the predetermined time period.

4. The method of claim 1, wherein the calculating the number of users of the plurality of users that are likely to access the media content item during the predetermined time period comprises:
    retrieving a respective media content item viewing profile associated with each of the plurality of users;
    identifying a subset of the retrieved media content item viewing profiles, wherein each retrieved media content item viewing profile in the subset comprises metadata matching metadata of the media content item stored on the server; and
    calculating the size of the subset.

5. The method of claim 4, wherein the metadata of the respective media content item viewing profiles of the users includes metadata of the previously viewed media content items.

6. The method of claim 1, wherein the proposal to delay the deletion comprises a proposal to delay deletion of a portion of the media content item.

7. The method of claim 6, wherein metadata associated with the portion matches metadata of respective media content item viewing profiles of the identified users.

8. The method of claim 1, wherein calculating the number of users of the plurality of users that are likely to access the media content item during the predetermined time period comprises:
    calculating the number of users of the plurality of users that are likely to access a portion of the media content item and calculating the number of users of the plurality of users that are likely to access the entire media content item;
    determining whether the calculated number of identified users that are likely to access the portion of the media content item exceeds the predetermined number and determining whether the calculated number of identified users that are likely to access the entire media content item exceeds the predetermined number; and
    in response to determining that the number of identified users that are likely to access the portion of the media content item exceeds the predetermined number and the number of identified users that are likely to access the portion of the entire media content item does not exceed the predetermined number, transmitting the proposal to delay the deletion of the portion of the media content item.

9. The method of claim 3, further comprising:
    after expiration of the predetermined time period, transmitting a proposal to extend the predetermined time period.

10. The method of claim 1, further comprising:
    providing an option to select a delay duration; and
    delaying the deletion of the media content item for the selected duration.

11. A system for managing storage of a media content item on a server, the system comprising:
    storage circuitry configured to:
        store a media content item on the server, wherein the media content item is accessible to a plurality of users;
    control circuitry configured to:
        receive a request to delete the media content item stored on the server;
        in response to receiving the request, calculate a number of users of the plurality of users that are likely to access the media content item during a predetermined time period;
        determine whether the calculated number of identified users exceeds a predetermined number; and
        in response to determining that the number of identified users exceeds the predetermined number, transmit a proposal to delay the deletion.

12. The system of claim 11, wherein the proposal comprises the calculated number.

13. The system of claim 11, wherein the control circuitry is further configured to:
    in response to acceptance of the proposal, delay the deletion of the media content item by the predetermined time period.

14. The system of claim 11, wherein, in calculating the number of users of the plurality of users that are likely to access the media content item during the predetermined time period, the control circuitry is further configured to:
    retrieve a respective media content item viewing profile associated with each of the plurality of users;
    identify a subset of the retrieved media content item viewing profiles, wherein each retrieved media content item viewing profile in the subset comprises metadata matching metadata of the media content item stored on the server; and
    calculate the size of the subset.

15. The system of claim 14, wherein the metadata of the respective media content item viewing profiles of the users includes metadata of the previously viewed media content items.

16. The system of claim 11, wherein the proposal to delay the deletion comprises a proposal to delay deletion of a portion of the media content item.

17. The system of claim 16, wherein metadata associated with the portion matches metadata of respective media content item viewing profiles of the identified users.

18. The system of claim 11, wherein, in calculating the number of users of the plurality of users that are likely to access the media content item during the predetermined time period, the control circuitry is further configured to:
- calculate the number of users of the plurality of users that are likely to access a portion of the media content item and calculate the number of users of the plurality of users that are likely to access the entire media content item;
- determine whether the calculated number of identified users that are likely to access the portion of the media content item exceeds the predetermined number and determine whether the calculated number of identified users that are likely to access the entire media content item exceeds the predetermined number; and
- in response to determining that the number of identified users that are likely to access the portion of the media content item exceeds the predetermined number and the number of identified users that are likely to access the portion of the entire media content item does not exceed the predetermined number, transmit the proposal to delay the deletion of the portion of the media content item.

19. The system of claim 13, wherein the control circuitry is further configured to:
- after expiration of the predetermined time period, transmit a proposal to extend the predetermined time period.

20. The system of claim 11, wherein the control circuitry is further configured to:
- provide an option to select a delay duration; and
- delay the deletion of the media content item for the selected duration.

* * * * *